April 11, 1944.　　　　　F. M. FREIS　　　　　2,346,374
IRONING MACHINE
Filed Aug. 29, 1941　　　13 Sheets-Sheet 1
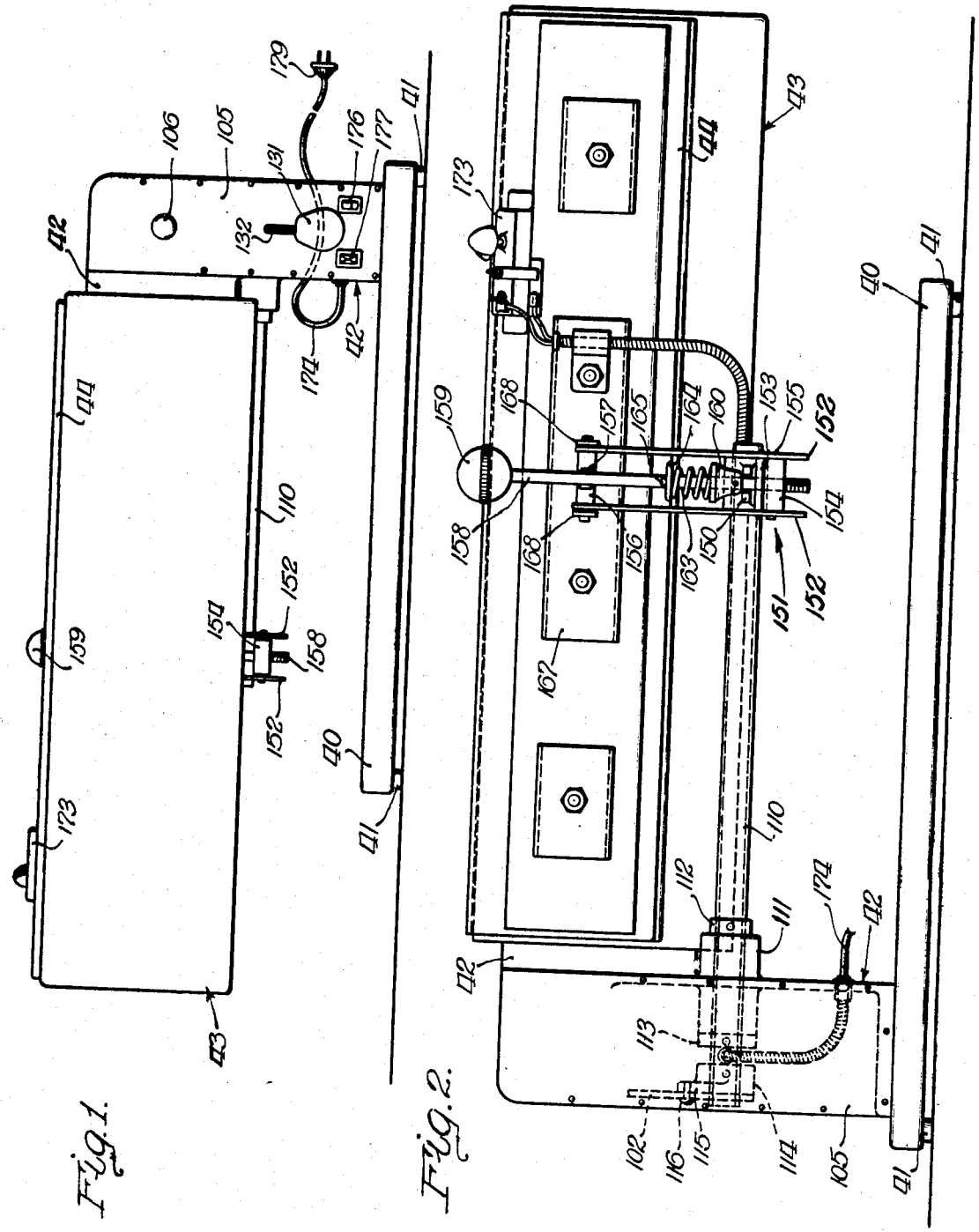
INVENTOR.
Frederick M. Freis
BY
Brown, Jackson, Boettcher & Dienner
Attys.

April 11, 1944.  F. M. FREIS  2,346,374
IRONING MACHINE
Filed Aug. 29, 1941  13 Sheets-Sheet 2

INVENTOR.
Frederick M. Freis
BY
Brown, Jackson, Boettcher & Dienner
Attys.

April 11, 1944. F. M. FREIS 2,346,374
IRONING MACHINE
Filed Aug. 29, 1941 13 Sheets-Sheet 4

INVENTOR.
Frederick M. Freis
BY
Attys.

April 11, 1944.　　　　　F. M. FREIS　　　　　2,346,374
IRONING MACHINE
Filed Aug. 29, 1941　　　13 Sheets-Sheet 5

INVENTOR.
Frederick M. Freis
BY
Brown, Jackson, Boettcher & Dienner
Attys.

April 11, 1944.  F. M. FREIS  2,346,374
IRONING MACHINE
Filed Aug. 29, 1941  13 Sheets-Sheet 6
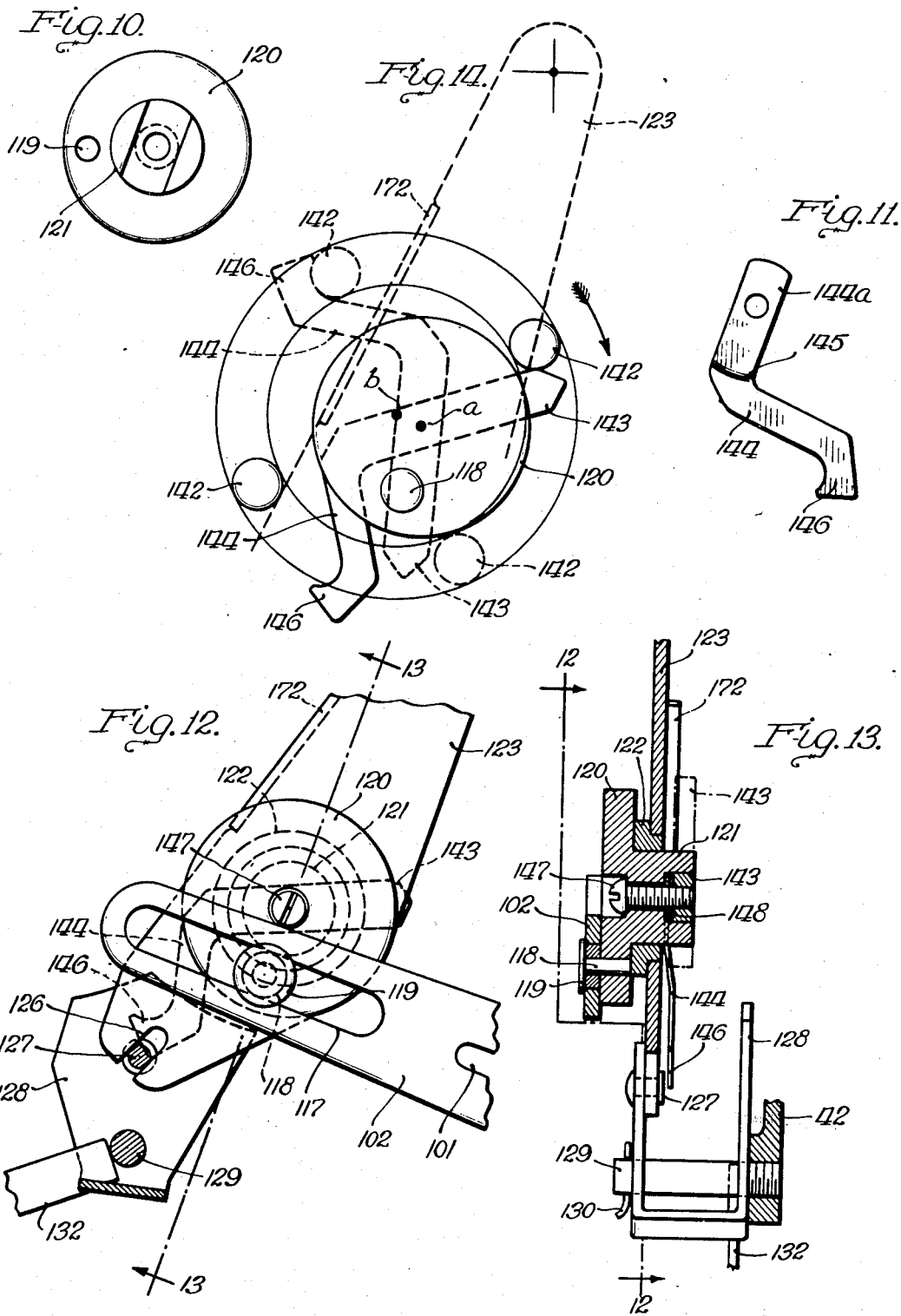
INVENTOR.
Frederick M. Freis
BY
Brown, Jackson, Boettcher & Dienner
Attys.

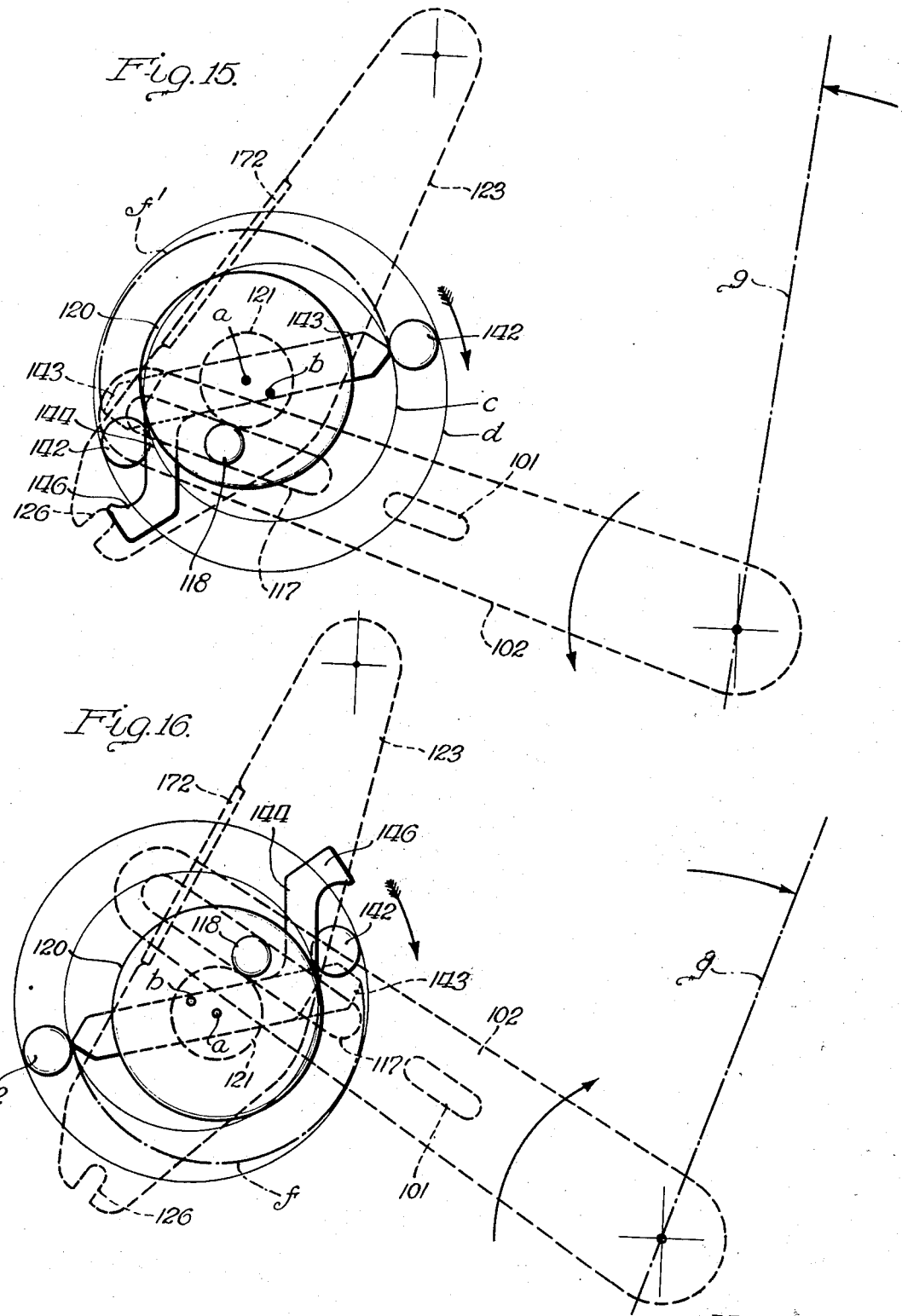

April 11, 1944.  F. M. FREIS  2,346,374
IRONING MACHINE
Filed Aug. 29, 1941   13 Sheets-Sheet 8

INVENTOR.
Frederick M. Freis
BY
Brown, Jackson, Boettcher & Dienner
Attys.

April 11, 1944.  F. M. FREIS  2,346,374
IRONING MACHINE
Filed Aug. 29, 1941  13 Sheets-Sheet 11

INVENTOR.
Frederick M. Freis
BY
Attys.

April 11, 1944.   F. M. FREIS   2,346,374
IRONING MACHINE
Filed Aug. 29, 1941   13 Sheets-Sheet 12
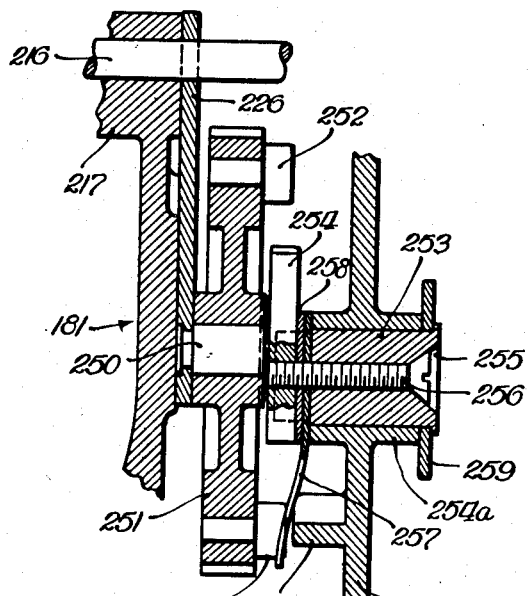
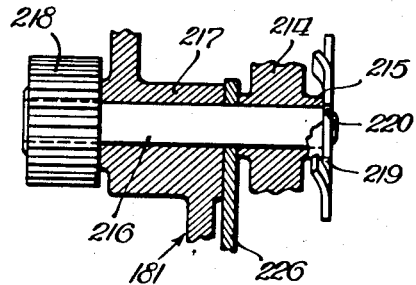
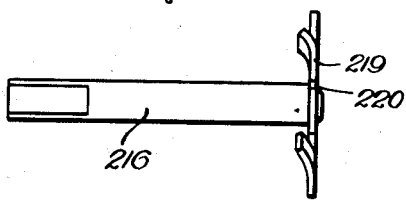
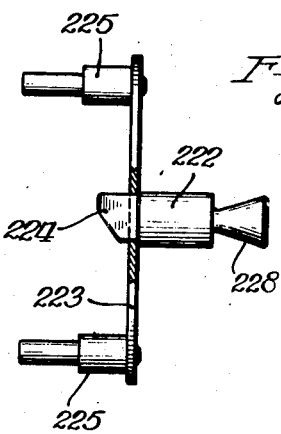
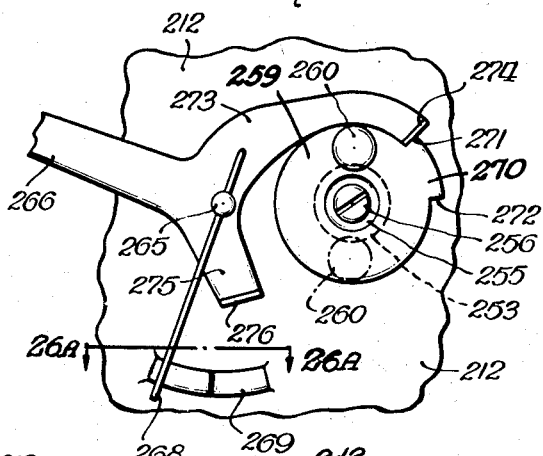
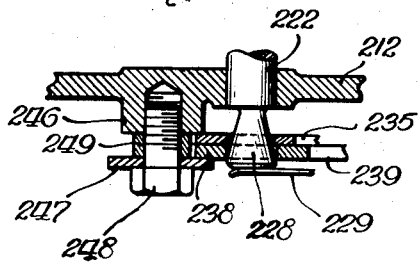
INVENTOR.
Frederick M. Freis
BY
Attys.

Patented Apr. 11, 1944

2,346,374

UNITED STATES PATENT OFFICE 2,346,374

IRONING MACHINE

Frederick M. Freis, Chicago, Ill., assignor to Conlon Corporation, Cicero, Ill., a corporation of Illinois Application August 29, 1941, Serial No. 408,703

22 Claims. (Cl. 38—61)

This invention relates to ironing machines and has to do with machines intended for domestic or home use.

My invention is directed to an ironing machine of the character stated which is of light weight, so as to be readily portable, and which is of compact construction, so as to occupy but little storage space. More specifically, I provide a machine comprising a roll mounted for rotation about a fixed axis and a cooperating shoe movable to and from the roll, the latter housing a motor for driving the roll and operating the shoe. The means providing driving and operating connections between the motor and the roll and the shoe comprises but few parts, with a view to light weight and compact and inexpensive construction. Many parts of the machine are so constructed as to be readily formed from metal stampings, which further contributes to light weight and reduced cost of production. The shoe operating means comprises means for holding the shoe to the roll under spring pressure and means for retarding the initial movement of the shoe away from the roll in a manner to prevent objectionable shock or jar incident to such movement of the shoe. The shoe operating means further includes a member continuously driven by the motor and an associated half revolution clutch for operating the shoe, a roll control clutch being provided for clutching and declutching the roll to and from the continuously driven member, the latter clutch being automatically actuated in accordance with movement of the shoe and means being provided for optionally holding the roll clutch in declutched condition in the movements of the shoe to and from the roll. Further objects and advantages of my invention will appear from the detail description.

In the drawings:

Figure 1 is a front view of an ironing machine embodying my invention;

Figure 2 is a back view of the machine of Figure 1 with the shoe cover removed;

Figure 10 is a detail inner end view of the outer shoe operating clutch member;

Figure 17:
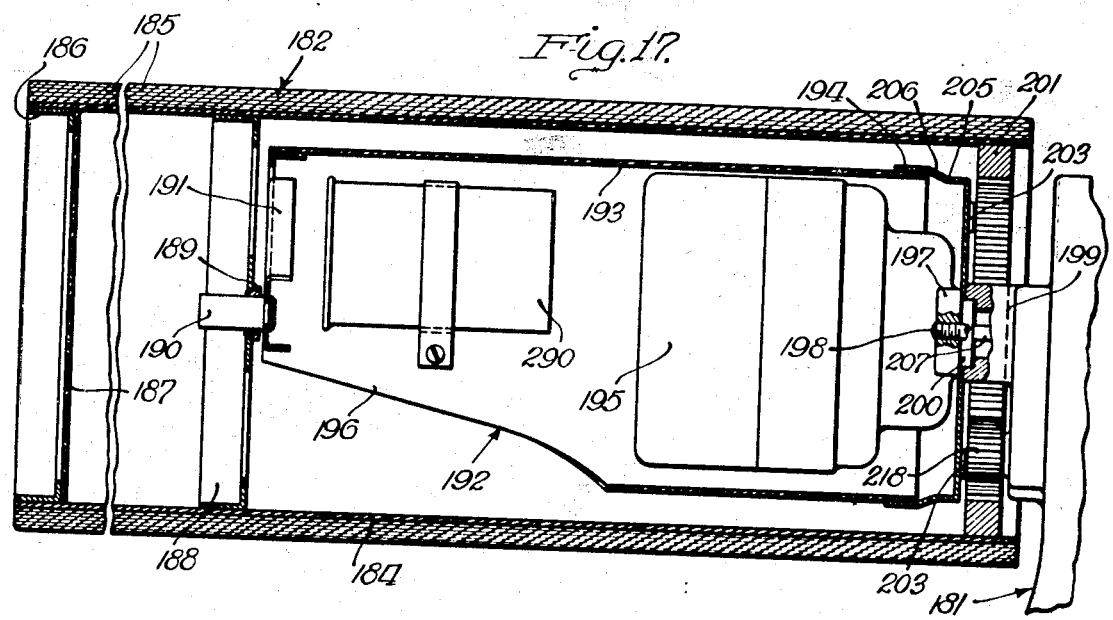
Figure 18:
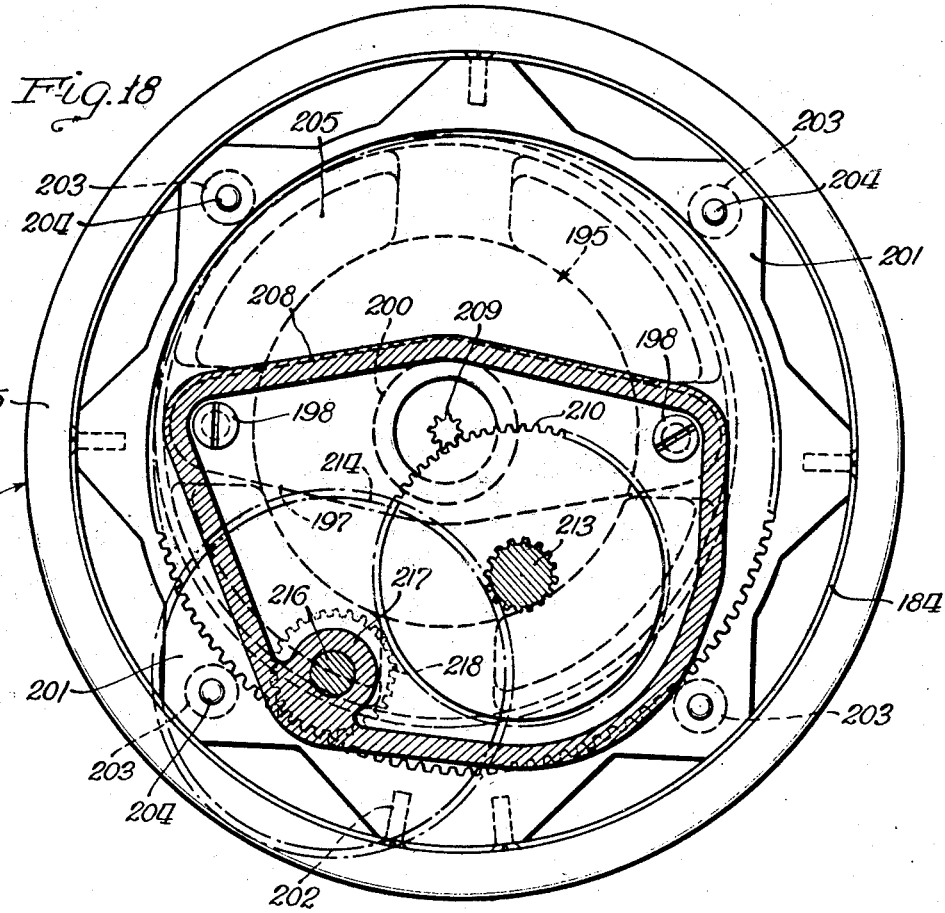
Figure 19:
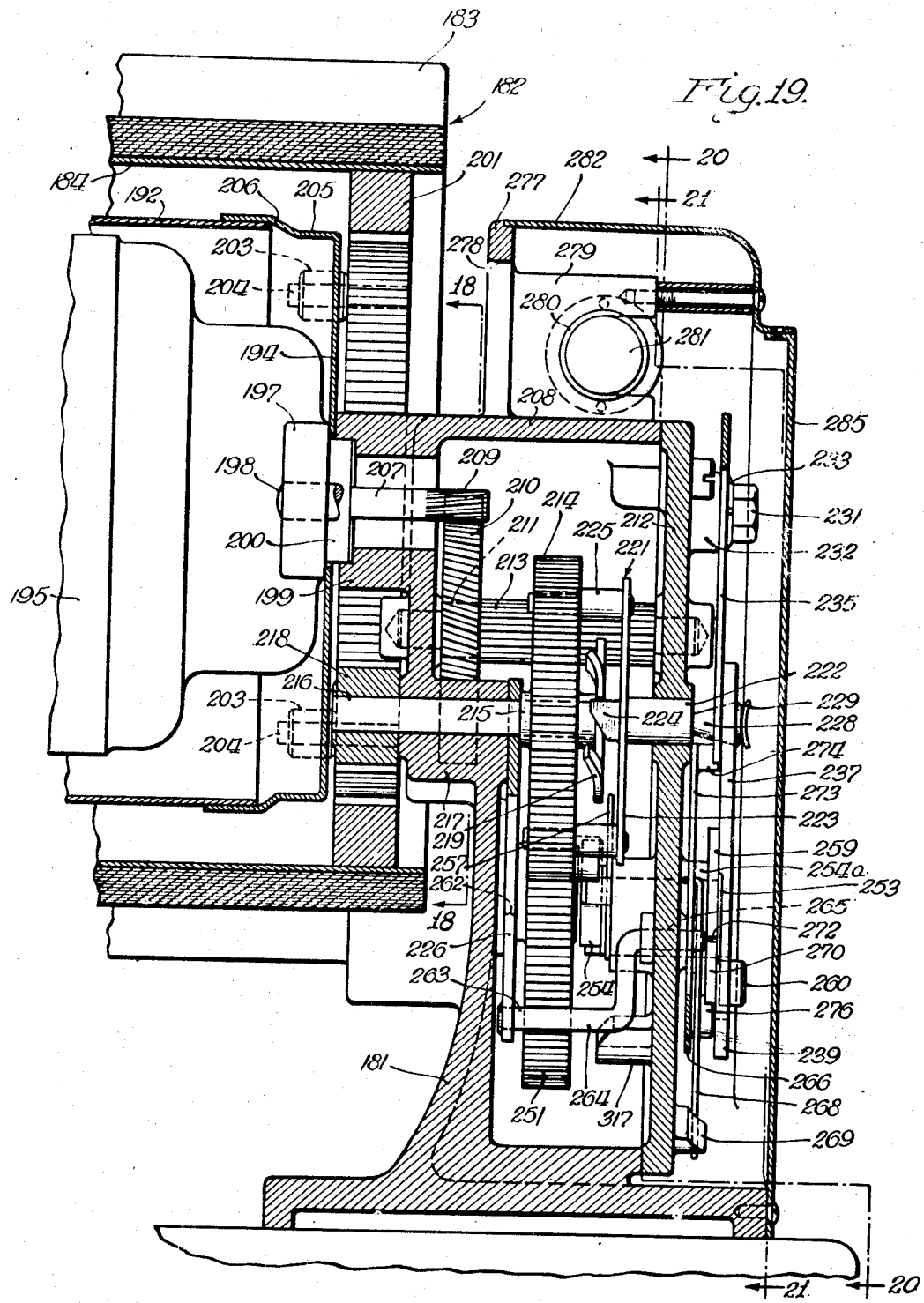
Figure 20:
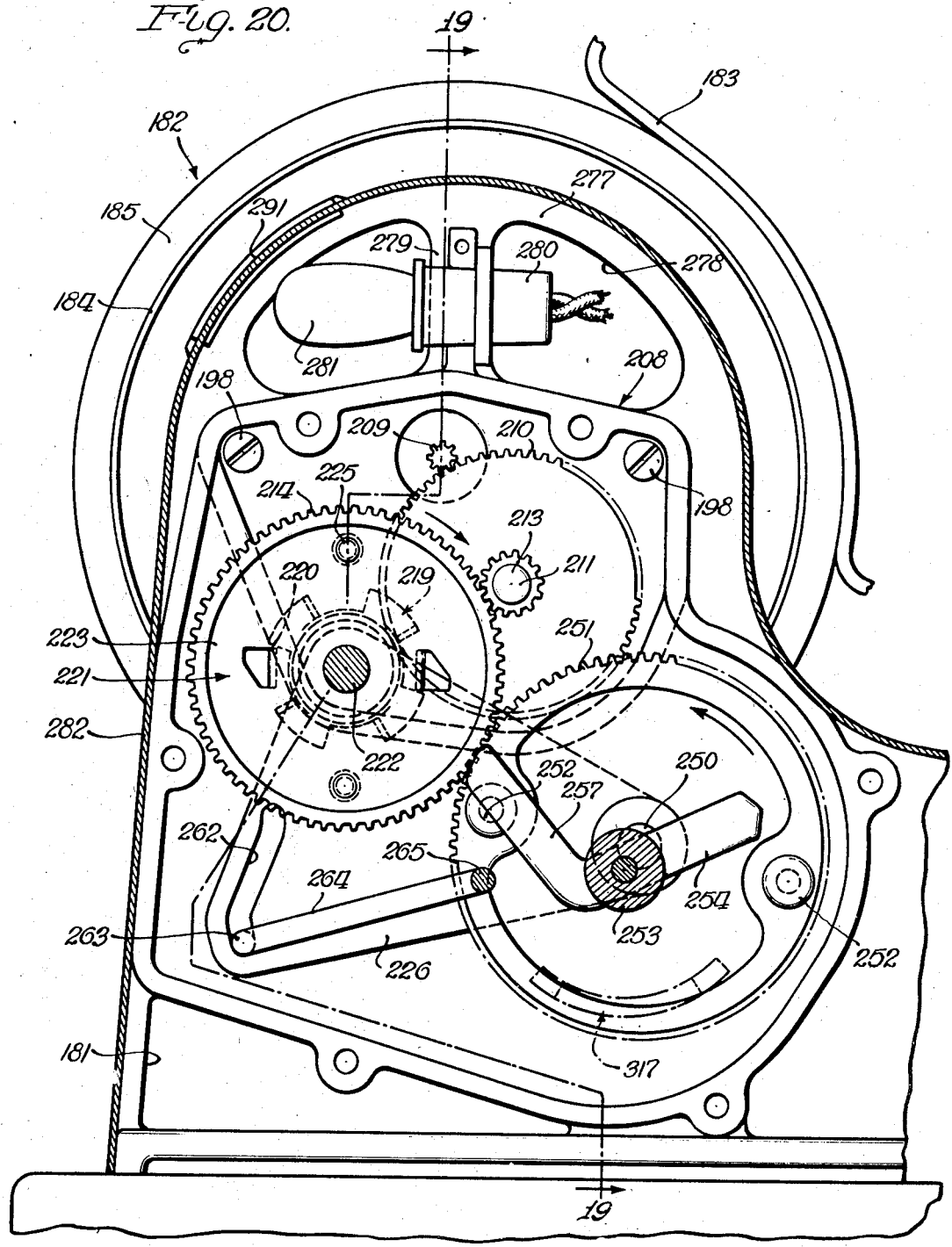
Figure 21:
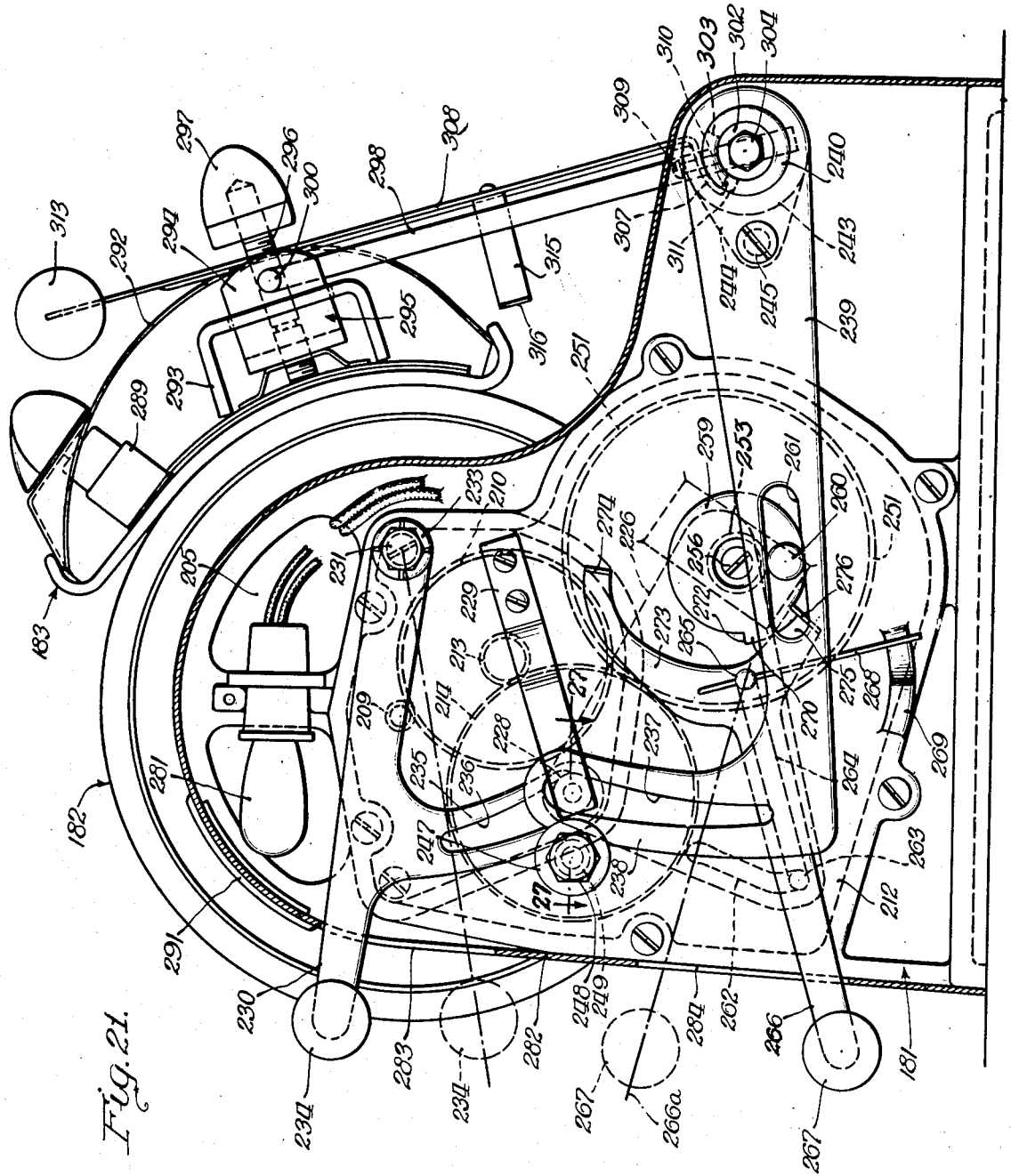

Figure 11 is a detail outer face view of the back lash spring of the shoe operating clutch, Figure 12 is an outer face view of the outer shoe operating clutch member, the arm carrying the latter member, the shoe operating arm, the control lever and associated parts, certain parts being broken away and certain other parts being shown in section, this view taken substantially on line 12—12 of Figure 13;

Figure 13 is a sectional view taken substantially on line 13—13 of Figure 12, certain parts being shown in elevation;

Figure 14 is a diagrammatic view of the shoe clutch and the associated supporting arm for the outer member of such clutch, showing the relation between the parts when the shoe operating arm is in lowered position and the relation of the parts when the back lash spring becomes effective in the upward movement of the shoe operating arm;

Figure 15 is a diagrammatic view on the order of Figure 14 but showing the relation of the parts immediately after the shoe operating arm has been moved into its lowered position;

Figure 16 is a diagrammatic view similar to Figure 15 but with the shoe operating arm in its raised or upper position;

Figure 17 is a vertical axial sectional view through the roll of a modified form of machine embodying my invention, showing the adjacent portion of the gear housing fragmentarily and in elevation, certain other parts being shown in elevation and certain parts being broken away;

Figure 18 is a sectional view taken substantially on line 18—18 of Figure 19;

Figure 19 is a sectional view taken substantially on line 19—19 of Figure 20, certain parts being shown in elevation;

Figure 20 is a sectional view taken substantially on line 20—20 of Figure 19, certain parts being broken away;

Figure 21 is a sectional view, on a reduced scale, taken substantially on line 21—21 of Figure 19 with certain parts broken away and in section;

Figure 22 is a vertical sectional view through the shoe shaft operating clutch and associated parts, the gear housing and the cover therefor being shown fragmentarily and in section, and certain parts being shown in elevation, on an enlarged scale;

Figure 23 is a view partly in elevation and partly in section of the inner roll clutch member and associated parts, on an enlarged scale, certain parts being broken away;

Figure 24 is a detail elevational view of the inner roll clutch member;

Figure 25 is a side view, on an enlarged scale, of the outer roll clutch member, partly broken away and in section;

Figure 26 is a detail outer face view of the control lever and the outer shoe arm operating clutch member and associated parts, the control lever being broken away and the gear housing cover being shown fragmentarily;

Figure 26A is a sectional view taken substantially on line 26A—26A of Figure 26;

Figure 27 is a fragmentary sectional view taken substantially on line 27—27 of Figure 21, certain parts being shown in elevation; and Figures 28 to 31, inclusive, are diagrammatic views illustrating the operation of the shoe operating clutch and associated parts.

The ironing machine shown in Figures 1 and 2 comprises a base 40 conveniently formed of sheet metal and rectangular in plan and provided with rubber bumpers 41, a gear housing bolted or otherwise suitably secured to base 40 adjacent one end thereof and extending upward therefrom, a roll 43 extending from gear housing 42 inward over base 40, and a shoe 44 mounted in back of roll 43 cooperating therewith and movable to and from the roll. Roll 43 comprises an inner cylinder 45, conveniently formed of sheet metal, and a pad 46 mounted upon cylinder 45 in a known manner. A cup disc 47 (Figure 5) is secured within cylinder 45, conveniently by spot welding, at about the mid-length thereof. Disc 47 is provided with a central opening in which is suitably secured a flanged bushing 48 disposed coaxially with cylinder 45, this bushing receiving a stud 49 secured to a plate 50 of a roll supporting bracket 51. This bracket 51 comprises arms 52 of elongated U-shape spot welded at their inner ends to plate 50. The arms 52 are suitably braced at their outer ends and are there secured to an inner side of head 53 of gear housing 42, in spaced relation to the inner side wall of head 53, by means of screw studs 54 secured in the latter wall and passing through the outer ends of arms 52, spacers 55 being disposed about studs 54 between arm 52 and the inner wall of gear housing head 53, nuts 56 being threaded on the studs 54 for securing arms 52, with intervening spring washers 57. The roll 43 is thus mounted by means of bracket 51 and associated parts, on the gear housing extending therefrom inward over the base 40 and for rotation about stud 49 at the inner end of bracket 51.

Figure 4:
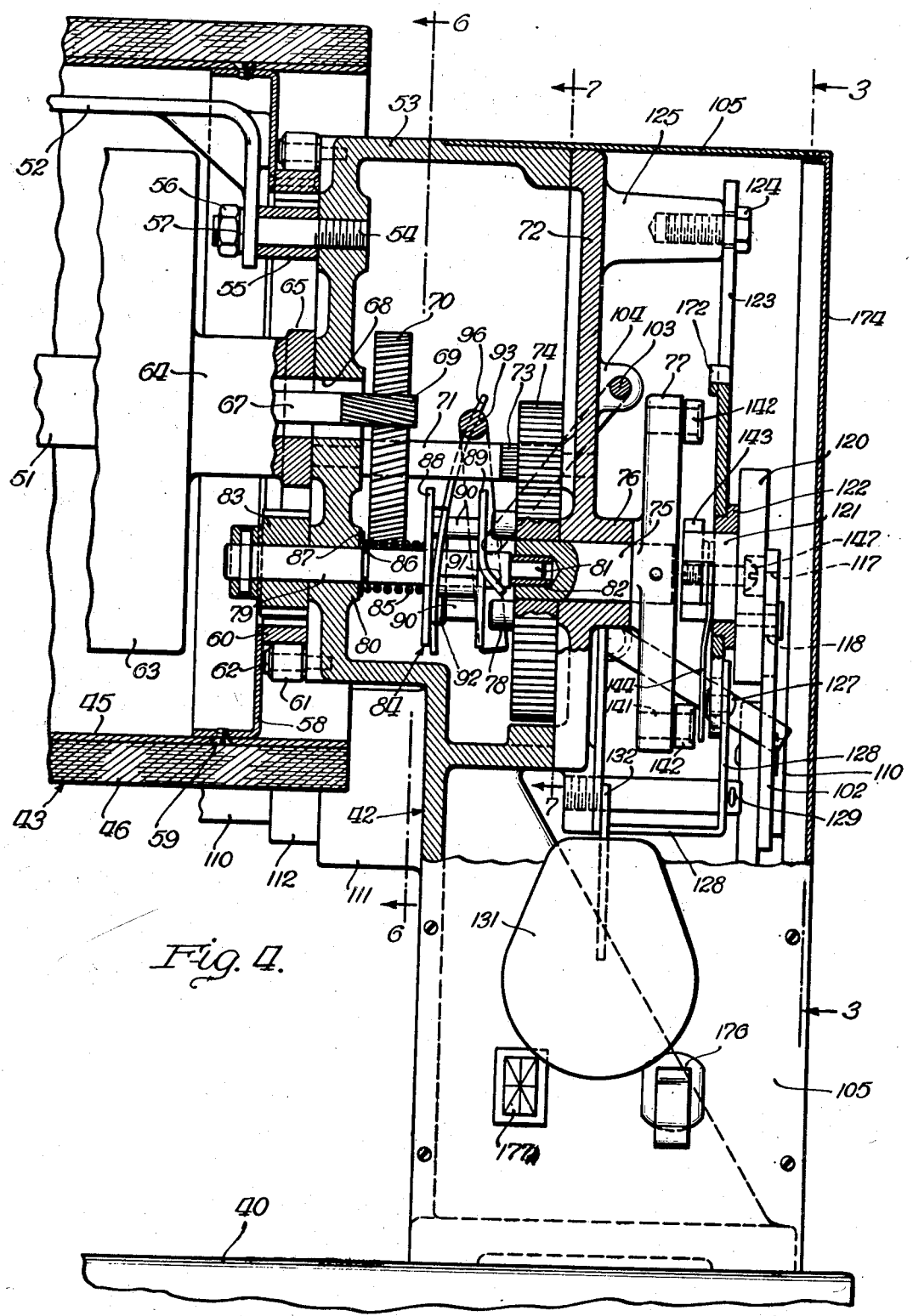
Figure 4 is a sectional view taken substantially on line 4—4 of Figure 3, certain parts being shown in elevation and certain other parts being broken away.
Figure 5:
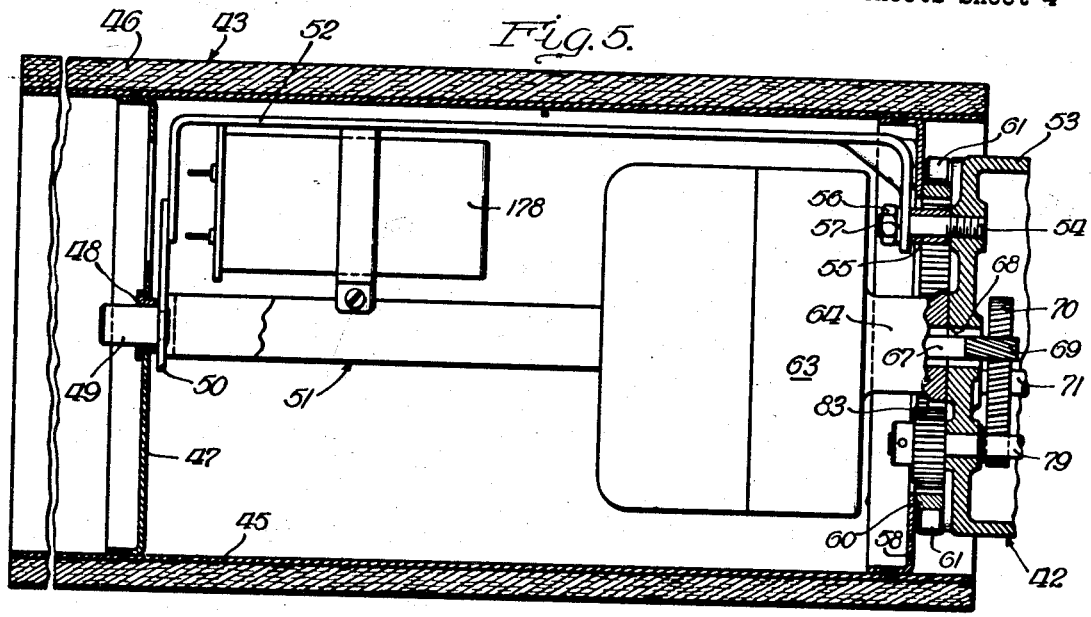
Figure 5 is a vertical axial sectional view, on a reduced scale, through the roll and the adjacent portion of the gear housing, certain parts being shown in elevation and certain other parts being broken away.

A cupped sheet metal disc 58 is secured, by means of screws 59, in cylinder 45 between the outer end of bracket 51 and the inner side wall of head 53 of the gear housing 42. An internal ring gear 60 is secured to disc 58 in any suitable manner, conveniently by riveting, in concentric relation to cylinder 45, disc 58 being provided with a central opening accommodating studs 54 and spacers 55, as shown in Figures 4 and 5. Supporting and guide rollers 61, mounted on headed pins 62 suitably secured in the inner side wall of gear housing head 53, contact the outer circumferential face of ring gear 60 and rotatably support the latter coaxially with cylinder 45 while restraining both ring gear 60 and cylinder 45 against transverse movement. As will be seen more clearly from Figure 4, ring gear 60 is confined axially between the inner side wall of head 53 and the outer ends of bracket arms 52, the latter being appropriately formed to that end and extending into close proximity to the inner face of disc 58. In that manner the roll 43 is confined against objectionable endwise movement. Ring gear 60 and stud 49 are disposed axially, as will be clear from the above, their common axis coinciding with the axis of cylinder 45, and the roll 43 is mounted for rotation about that fixed axis and is confined against transverse movement.

Figure 6:
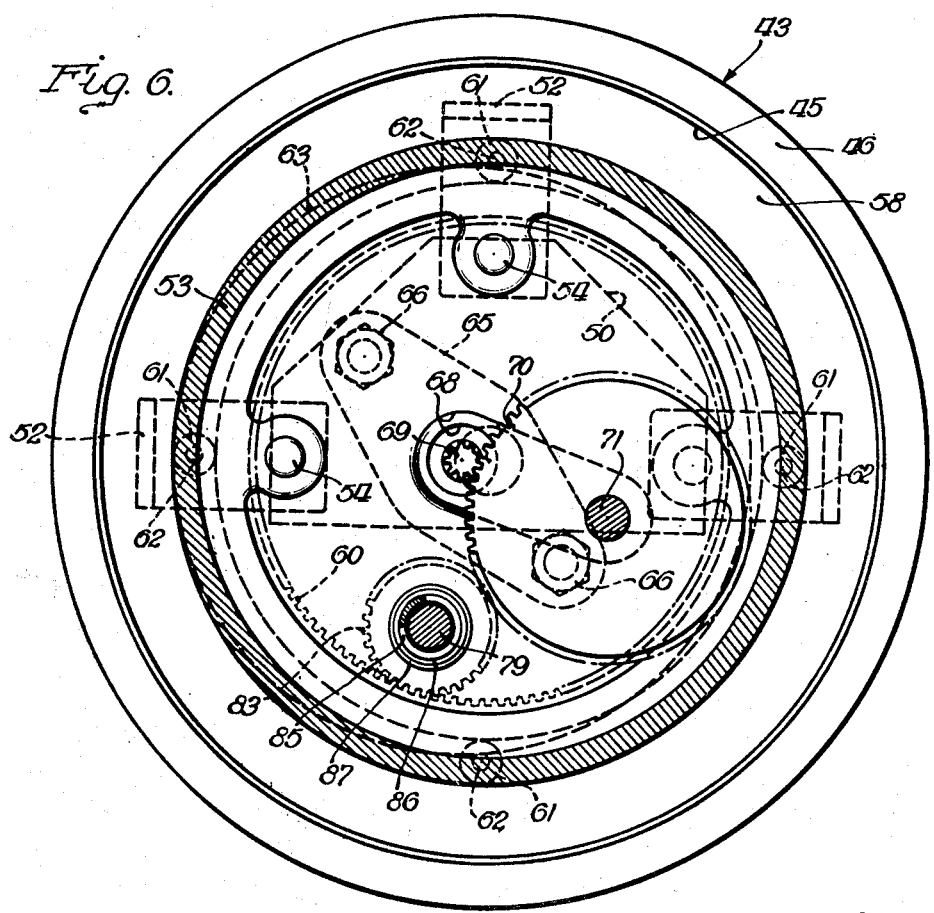
Figure 6 is a sectional view taken substantially on line 6—6 of Figure 4.

Roll 43 houses an electric motor 63 of suitable type provided at its outer end with a reduced neck 64, the latter having at its outer end a suitably formed head 65 (Figure 6) suitably secured to the inner side wall of head 53 of gear housing 42, conveniently by means of bolts 66. Shaft 67 of motor 63 extends into gear housing head 53, through an opening 68 therein aligned with the bore of neck 64, as will be clear from Figure 4.

Motor shaft 67 is provided at its inner end with a helical pinion 69 secured thereon, conveniently formed integrally with shaft 67, which pinion 69 meshes with a helical gear 70 secured on a shaft 71 rotatably mounted in the inner side wall of gear housing head 53 and in a cover 72 removably secured to the outer side of head 53, conveniently by means of screws. Shaft 71 is provided, adjacent cover 72, with a spur pinion 73 secured thereon, conveniently formed integrally therewith, meshed with a spur gear 74 secured on the inner end of a stub shaft 75 rotatably mounted through a boss 76 of cover 72. A two-armed head 77 is secured upon the outer end of stub shaft 75 in contact with the outer end of boss 76, gear 74 and head 77 cooperating with boss 76 to confine stub shaft 75 against endwise movement through boss 76. It will be seen that when the motor 63 is in operation gear 74 and with it stub shaft 75 and head 77 are continuously driven from the motor.

Gear 74 is provided, at its inner face, with two inwardly projecting diametrically opposite clutch pins 78 equidistant from the axis of this gear. A counter shaft 79, parallel with shaft 71 and with motor shaft 67, is rotatably mounted through a boss 80 on the inner side wall of gear housing head 53, coaxially with stub shaft 75, and is reduced at its inner end to provide a stud 81 piloted in a bushing 82 mounted in a corresponding bore in the inner end of stub shaft 75. A spur pinion 83 is secured on the outer end of countershaft 79 and meshes with the spur internal ring 60. The gear 74 and pin 78 thereof constitute an outer roll clutch member which cooperates with an inner roll clutch member 84 slidable on countershaft 79 and yieldingly urged toward gear 74, by a compression coil spring 85 mounted about shaft 79 and confined between clutch member 84 and a key 86 of known type engaging in a circumferential groove in shaft 79, at the inner face of a washer 87 seating against the inner end of boss 80. The key 86 cooperates with washer 87, boss 80 and pinion 83 for confining shaft 79 against endwise movement in either direction, as will be clear from Figure 4.

Figure 7:
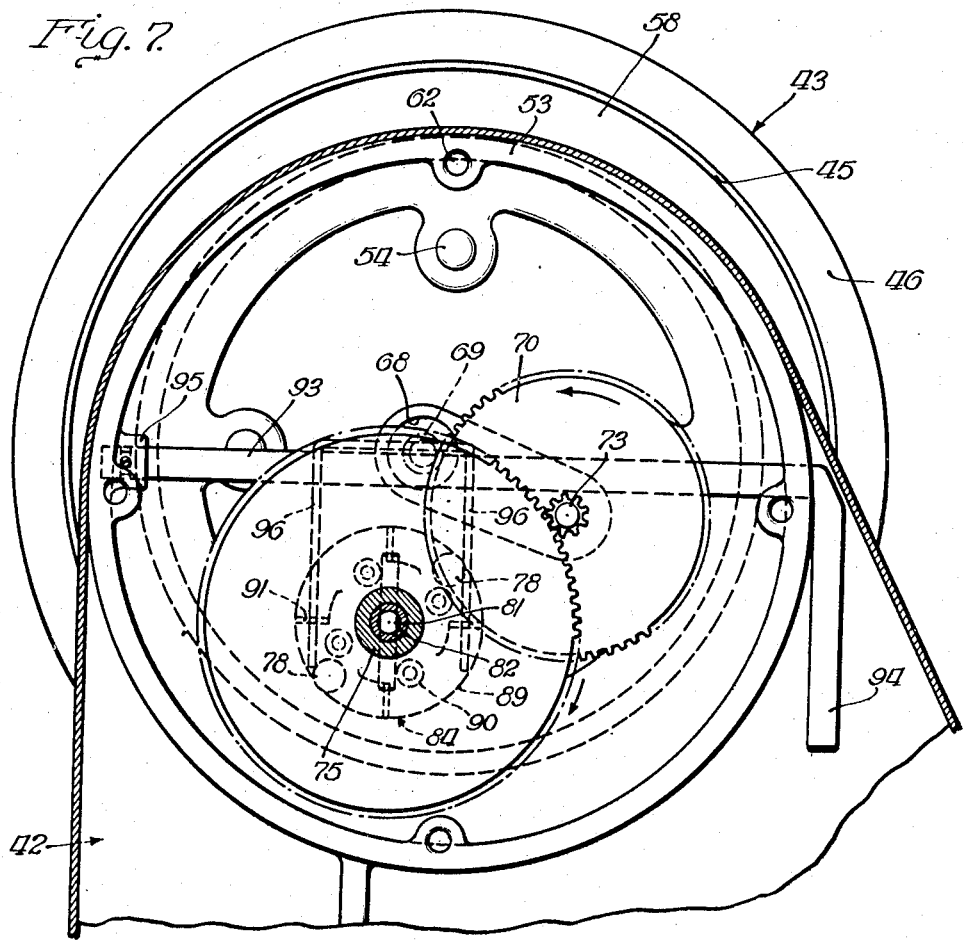
Figure 7 is a sectional view taken substantially on line 7—7 of Figure 4.
Figure 9:
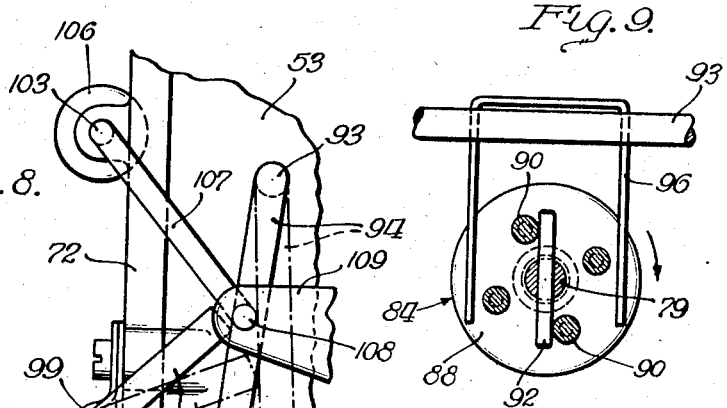
Figure 9 is a detail view of the inner roll clutch member and associated clutch shifting means, the clutch member being shown in vertical section.

In the use of the ironing machine, roll 43 is rotated downward and rearward for moving the articles being ironed between the roll and shoe 44, as is known, which means that the gear 74 is rotated clockwise as viewed from its outer face as in Figure 7. The inner roll clutch member 84 comprises two discs 88 and 89, conveniently in the form of steel stampings, secured together in spaced relation by pins or spacers 90. The outer disc 89 has four clutch fingers 91 struck therefrom and bent outwardly, as will be clear from Figures 4 and 7, these fingers being disposed for contact by the pins 78 of gear 74. A pin 92 is secured through countershaft 79 and passes between the pins 90 for contact with two diametrically opposite pins, as shown in Figure 9. When clutch member 84 is in its operative or clutching position, shown in Figure 4, pins 78 of gear 74 contact the two diametrically opposite fingers 91 of disc 89 thus driving clutch member 84 clockwise with gear 74. The two diametrically opposite spacers 90 are thus brought into contact with pin 92, adjacent the ends thereof, thus driving countershaft 79 and thereby driving roll 43 from gear 74.

Figure 8:
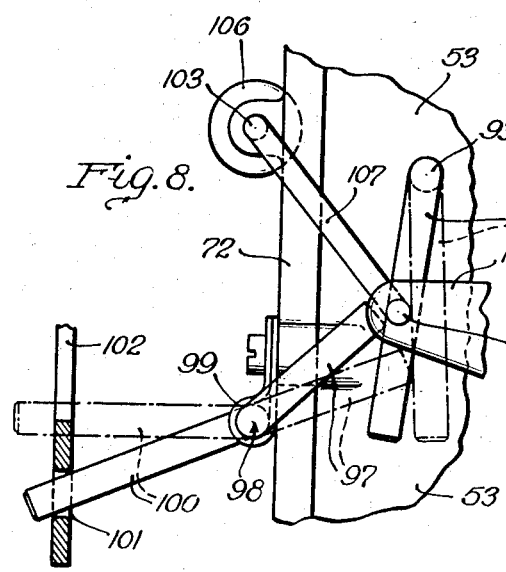
Figure 8 is a detail view of the roll clutch shift means and associated parts taken substantially on line 8—8 of Figure 3.

Means is provided for shifting clutch member 84 into and out of cooperating relation to the pins 78 of gear 74. A shift rod 93 extends from front to back of the gear housing head 53 above and perpendicular to shaft 71, this rod passing through the back of head 53 and being there provided with a depending arm 94 disposed at right angles to rod 93. At its forward end rod 93 is rockably mounted in a boss 95 of head 53 and any suitable known means is provided for confining rod 93 against lengthwise movement. An inverted U-shaped yoke member 96 is secured through rod 93, with its arms extending downward therefrom and disposed to contact the outer face of disc 88, adjacent the sides thereof, in position to clear the ends of pin 92. Arm 94 of shift rod 93 is disposed to be contacted by inner arms 97 of a Z-shaped lever 98 rockably mounted in a clip 99 secured on the outer face of cover 72 at the rearward portion thereof. Outer arm 100 of lever 98 extends through a slot 101 in a shoe operating arm 102, connected to the shoe 44 for moving the latter to and from roll 43, as will be explained more fully presently. When shoe 44 has been moved to roll 43 into cooperating relation therewith, shoe operating arm 102 occupies its lowered position shown in Figure 3, at which time arm 97 of lever 98 extends upward at an inclination and arm 94 of rod 93 is disposed at a downward and outward inclination, as shown in Figure 8. The inner roll clutch member 84 is then held in its outer position shown in Figure 4, by the compression spring 85, thus clutching the roll 43 to gear 74 to be driven thereby. When shoe operating arm 102 is turned clockwise, from its lowered position shown in Figure 3 into its upper or raised position for moving the shoe away from the roll, as will be more fully explained presently, lever 98 is turned clockwise, as viewed in Figure 8, by contact of shoe operating lever 102 at the lower side of slot 101 with arm 100, thus swinging arm 97 downward in contact with arm 94 and swinging the latter arm inward, the parts referred to then occupying the positions indicated in dotted lines in Figure 8. That turns the shift rod 93 clockwise, as viewed in Figure 4, thus moving the inner roll clutch member 84 away from gear 74 into its inoperative or declutching position, stopping drive of the roll. When the shoe operating arm 102 is again moved into its lowered position, moving the shoe into cooperating relation to the roll, clutch member 84 is moved outward into clutching position, reestablishing the drive between gear 74 and the roll. It will thus be seen that the roll 43 is clutched to and declutched from the motor 63 responsive to movement of the shoe 44 to and from the roll, automatically stopping drive of the roll when the shoe is moved rearward out of cooperating relation to the roll and causing driving of the roll when the shoe is moved forward into cooperating relation thereto. When it is desired to maintain the roll declutched from the motor, as when using the machine for pressing, shift rod 93 may be held in position to maintain inner roll clutch member 84 in its disengaged or declutched position. For that purpose a declutching rod 103 is slidably mounted through bosses 104 extending from the outer face of cover 72. Rod 103 extends forwardly through a sheet metal casing 105 suitably secured to and enclosing gear housing 42, and is provided at its forward end with an operating button 106 suitably secured thereon. At its rearward end rod 103 is provided with a downwardly and rearwardly inclined arm 107 bent to provide a terminal finger 108 slidable through an angle bracket 109 secured to gear housing 42 adjacent the rearward portion of head 53 thereof. When rod 103 is in its rearward position, shown in full lines in Figure 3, arm 107 thereof is disposed to clear arm 94 of shift rod 93 and the roll clutch may then be operated automatically in the manner previously described. By pulling rod 103 forwardly into its dotted line position indicated in Figure 3, arm 94 of shift rod 93, if the latter is in its position shown in full lines in Figure 8, may be forced rearwardly into its dotted line position shown in that figure, in which latter position it will then be retained by the lower end portion of arm 107 and finger 108, independently of the movement of lever 98 responsive to raising and lowering of the shoe operating arm 102. Alternatively, if the lever operating arm 102 is in its lowered position shown in Figure 3, it may be moved into its upper or raised position so as to move arm 94 of clutch shift rod 93 into its inner dotted line position shown in Figure 8, after which the declutching rod 103 may be pulled forwardly for maintaining arm 94 in its rearward position. That provides simple and efficient means whereby the roll clutch may be automatically controlled by the shoe operating arm 102, or, if desired, may be maintained in its inoperative or declutched position, without interfering with operation of the means for moving the shoe to and from the roll.

Figure 3:
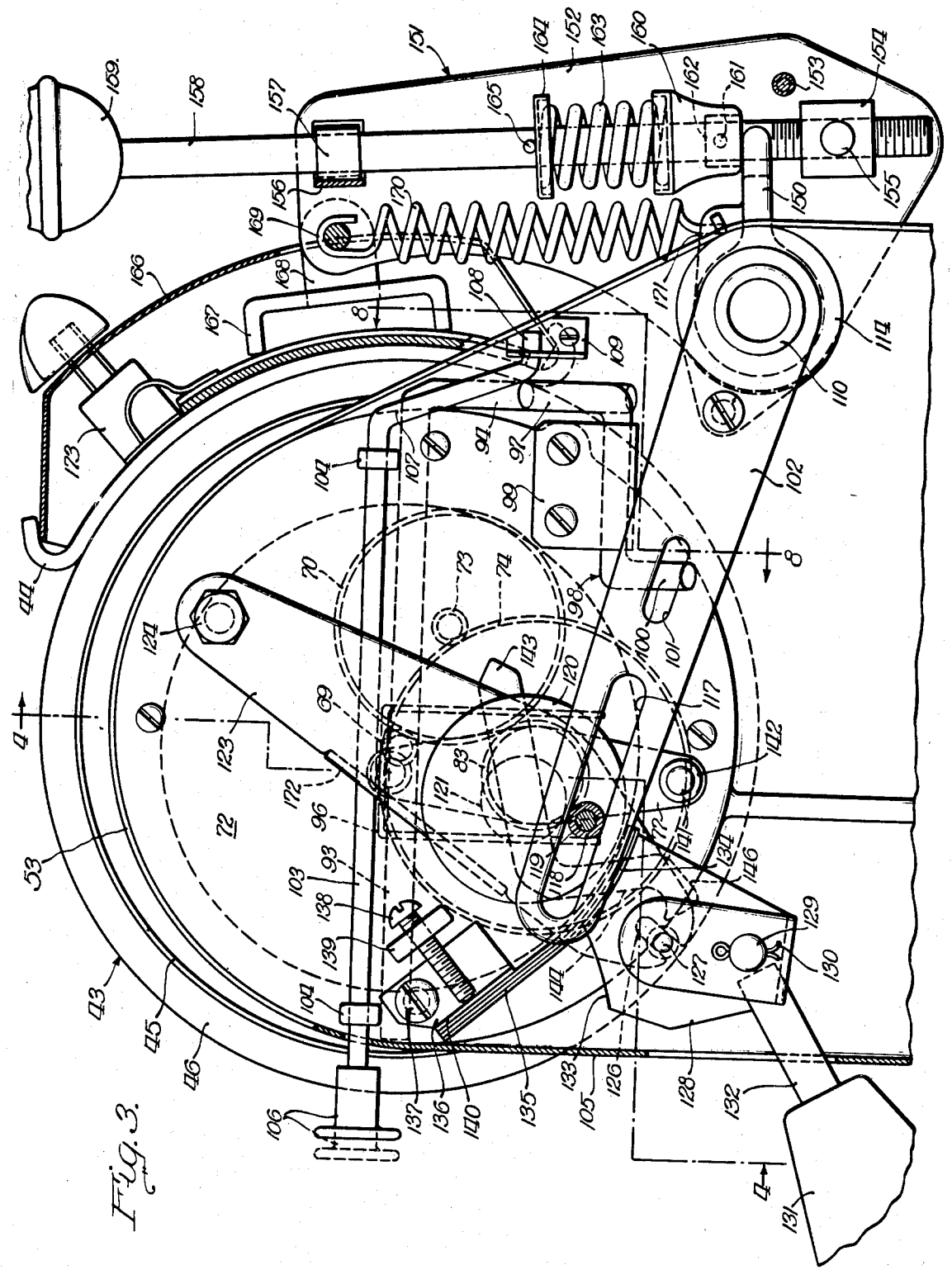
Figure 3 is an outer end view, on an enlarged scale, of the gear housing and shoe and associated parts, taken substantially on line 3—3 of Figure 4 with the cover of the gear housing casing removed and certain parts shown in section, certain other parts being broken away and shown in section.

Shoe operating arm 102 is mounted at its rearward end on the outer end of a tubular shoe shaft 110 rockably mounted in a sleeve 111 formed integrally with the gear housing 42, shaft 110 being confined against endwise movement by stop collars 112 and 113 suitably secured thereon and contacting the ends of sleeve 111. A flanged hub 114, shown in Figures 2 and 3, is secured on the outer end portion of shaft 110 and arm 102 is secured to flange 115 of hub 114 in a suitable manner, conveniently by means of a screw 116. It will be seen that when shoe operating arm 102 is swung upward about the axis of shaft 110, in a clockwise direction as viewed in Figure 3, shaft 110 is turned clockwise for moving shoe 44 rearward away from roll 43, and when arm 102 is swung downward into its lowered position shown in Figure 3 shaft 102 is turned counterclockwise, as viewed in Figure 3, for moving the shoe to the roll into cooperating relation thereto.

Shoe operating arm 102 is provided, in its forward portion, with a lengthwise slot 117 which receives a roller 118 carried by a headed pin 119, shown more clearly in Figures 12 and 13, secured in a disc 120 at the outer end of an outer shoe operating member 121. The latter member 121 is rotatably mounted in a flanged bushing 122 secured in a supporting arm 123 pivotally mounted at its upper end, by means of a cap screw 124 (Figure 4) threading into a boss 125 projecting from the outer face of cover 72. Arm 123 extends downward and forward beyond member 121 and is provided, at its lower end, with a lengthwise slot 126 which receives a headed pin 127 secured in the outer arm of a U-shaped control lever 128 pivoted on a pin 129 secured to gear housing 42, at the lower forward portion thereof, lever 128 being confined between the gear housing and a cotter pin or other suitable stop member secured through pin 129 adjacent the outer end thereof. An operating handle, comprising a knob 131 and a shank 132 extending therefrom, is secured to one arm of lever 128, conveniently by spot welding shank 132 thereto. The inner arm of lever 128 is provided with two upper cam surfaces 133 and 134 (Figures 3 and 12) for contact with a multiple leaf spring 135 secured to an angle bracket 136 pivoted at its upper end, as by means of a screw 137, to cover 72 at the outer face thereof. A pressure screw 138, threaded through a boss 139 extending from the outer face of cover 72, bears against flange 140 of bracket 136 for adjusting the pressure of spring 135 on the cam surface 133 or 134, as the case may be. When the control lever 128 is in its position shown in Figure 3, spring 135 bears upon cam surface 134 and maintains lever 138 in such position. When knob 131 is moved from its lowered position shown in Figure 3 into its upper position (not shown), control lever 128 is turned clockwise into a position in which spring 135 bears upon cam surface 133, thus holding the control lever in its latter position. It will be apparent that, by means of the control lever 128, the supporting arm 123 may be turned a predetermined distance in opposite directions about cap screw 124.

Head 77 (Figures 3 and 4) is provided with two outwardly extending headed pins 141, disposed at opposite sides of and equidistant from the axis of stub shaft 75, each of these pins carrying a roller 142. The outer roll operating member 121 is disposed with its inner end adjacent the outer face of head 77, as shown more clearly in Figure 4, and is provided at its inner end with a diametrical slot which receives a key 143 of rectangular cross section, the outer end portion of which may be bevelled on opposite sides as shown. The slot in member 121 also receives shank 144a of what I term a back lash leaf spring 144, shaped as shown in Figure 11, the body portion of this spring being bent or offset slightly inwardly relative to shank 144a, at 145 and as shown more clearly in Figure 13. The outer or free end of spring 144 is shaped to provide a hook element 146, the leading edge of which substantially conforms in curvature to the circumference of the rollers 142. A screw 147, having a head seating in a recess in the disc 120, passes through shank 144a of spring 144 and through a spacer 148 disposed between shank 144a and key 143, this screw threading into key 143 and serving to secure the latter in member 121 while also clamping the shank of key 144 and the spacer 148 in position between key 143 and the bottom or outer wall of the slot in member 121. Head 77 rotates about a fixed axis and supporting arm 123 may be adjusted by control lever 128 so as to dispose the axis of rotation of member 121 eccentric to and alternately at opposite sides of the axis of head 77. Key 143 extends inwardly into the plane of rotation of pins 141 and rollers 142 and projects to one side of member 121 such a distance that, when member 121 is moved from one position of eccentricity to the other, one of the pins will pick up key 143 and turn it through approximately one-half of a revolution and then pass out of contact with the key, the latter being then disposed to clear the pins 141 and rollers 142 in the continued rotation of head 77. This operation will be understood more clearly from the diagrammatic views of Figures 14 to 16, inclusive. When the shoe operating arm 102 is in its lowered position shown in Figure 3, with the shoe 44 in cooperating relation to roll 43, the axis $a$ of member 121 is disposed in front of and slightly above axis $b$ of head 77, as shown in Figure 15. The annular space defined by the two concentric circles $c$ and $d$ correspond to the path of travel of rollers 142, key 143 being then disposed to clear the rollers in the continued rotation thereof. In order to swing the shoe operating arm 102 upward, control lever 128 is turned clockwise, as viewed in Figure 3, into its other position, thus shifting the axis $a$ of member 121 from its position shown in Figure 15 to its position shown in Figure 14, in back of and slightly below axis $b$ of head 77. That projects key 143 into the path of travel of the pins 141 and rollers 142, so that one of the rollers contacts key 143 and turns it a half revolution into the full line position shown in Figure 16, the key 143 being then disposed to clear the rollers and the pins which continue rotating. In Figure 16, key 143 is shown in dotted lines in the same position as in Figure 14 and the semi-circular path described by the outer end of key 143, during its travel from its dotted line position shown in Figure 16 to its full line position there shown, is indicated by the dot and dash line $f$. If arm 123 be now moved into its position shown in Figure 15, with key 143 remaining in its dotted line position shown in this figure, key 143 will be picked up by one of the rollers 142 and turned to its full line position shown in Figure 15, the outer end of the key describing the semi-circular path indicated by the dot and dash line $f^1$. Head 77 and member 121 and associated parts thus provide a half revolution clutch for turning member 121 and disc 120 thereof intermittently through approximately one-half of a revolution, responsive to shifting of the axis of member 121 from a position at one side of the axis of head 77 to a position at the opposite side of the latter axis. Turning of disc 120 through a half revolution serves to either raise or lower the forward end of the shoe operating arm 102, as the case may be, due to the eccentric pin and slot connection between that arm and disc 120. In either position of shoe operating arm 102 the point of pressure between this arm and roller 118 is substantially on dead center with pin 119 and disc 120 which, in conjunction with the slight friction between the parts, effectively holds the shoe operating arm 102 in its adjusted position.

Shoe shaft 110 extends inwardly above base 40 to about the mid-length of the shoe 44. A coupling arm 150 is secured on the inner end of shaft 110 and extends rearwardly therefrom, this arm being slotted from its rearward end. A shoe supporting arm 151, comprising two plates 152 (Figure 2), is loosely mounted on shaft 110 and straddles arm 150. At their rearward lower portions the plates 152 are secured together by a spacer 153 and a block 154, disposed between plates 152, is pivotally mounted therein below coupling arm 150, by means of associated studs 155. Adjacent their upper ends plates 152 are secured together by a U-shaped bridge member 156, the arms of which are spot welded or otherwise suitably secured to plates 152. Bridge member 156 carries a rearwardly opening spring clip 157 of known type, secured thereto in a suitable manner and disposed to receive the upper portion of a release rod 158 provided at its upper end with a knob 159. The lower portion of rod 158 is threaded and screws through block 154. A thimble 160 is loosely mounted on rod 158 for movement lengthwise thereof, downward movement of this thimble being limited by a pin 161 secured through rod 158 and disposed within a recess 162 extending from the lower end of thimble 160. At its upper end, thimble 160 is recessed to provide a seat for the lower end of a coil compression spring 163, disposed about rod 158 and confined between thimble 160 and an inverted cup member 164 mounted on rod 158 and confined against upward movement thereon, by a pin 165 secured through the rod. The lower portion of thimble 160 is rounded as shown in Figure 3, to facilitate movement thereof onto the upper face of arm 150 when rod 158 is swung forwardly into its coupling position shown in Figure 3, in which position of the rod spring 163 is under compression.

The shoe 44 is of known type and is provided with a sheet metal cover 166, providing with the shoe a housing for enclosing the heating elements and associated parts. A channel clamping bar 167 is bolted or otherwise suitably secured to the back of shoe 44 at the mid-portion thereof and has secured thereto, by welding or in any other suitable manner, two spaced ears 168. A pin 169 extends through the upper forward portions of plates 152 and through ears 168, providing a pivotal connection between shoe 44 and shoe supporting arm 151, to which arm the shoe is thus connected for movement therewith to and from the roll 43. A coil tension spring 170 is attached at its upper end to pin 169, conveniently by being hooked thereover, the lower end of this spring being hooked through a web element 171 formed integrally with the coupling arm 150. Since the line of pull of spring 170 is in back of shaft 110, this spring tends to swing the shoe supporting arm 151 rearward and downward, assuring proper contact of thimble 160 with coupling arm 150, when rod 158 is swung forward into coupling position. Normally, rod 158 remains in its coupling position shown in Figure 3, thus coupling shoe supporting arm 151 to shaft 110 for movement therewith. When shoe operating arm 102 is swung upward, the shoe supporting arm 151 is moved downward and rearward so as to move shoe 44 away from roll 43, and, when arm 102 is swung downward, shoe supporting arm 151 is swung forward moving the shoe to the roll into cooperating relation therewith, and spring 163 is placed under compression holding the shoe to the roll under spring pressure. In order quickly to release the shoe from the roll, rod 158 is moved rearwardly so as to disengage thimble 160 from arm 150, spacer 153 limiting this rearward movement of rod 158. When the release rod 158 has been thus disengaged from arm 150, tension spring 170 swings shoe supporting arm 151 rearward and downward moving the shoe away from the roll. It will be understood that spring 163 is considerably heavier than tension spring 170 and that the latter does not objectionably interfere with the function of spring 163 in holding the shoe to the roll under spring pressure. The above described quick release means for coupling the shoe to and releasing it from the shoe shaft 110 constitutes the subject matter of my copending application, Serial No. 462,538, filed October 19, 1942, as a division of my instant application.

Since spring 163 is under compression and spring 170 is under tension when shoe 44 is in cooperating relation to roll 43, shoe operating arm 102 tends to cause the shoe coupling member 121 to overrun head 77, during the initial movement of the shoe away from the roll and after the disc 120 has been turned a short distance so as to move roller 118 out of dead center position. That would cause more or less abrupt movement of the shoe away from the roll with resulting objectionable shock or jar. In order to prevent that, I provide means for retarding rotation of member 121 during movement of the shoe away from the roll. The means referred to is shown more clearly in Figures 3, 14, and 15. Supporting arm 123 is provided with an inwardly extending flange providing a cam element 172, suitably disposed and formed for travel therealong of the free portion of back lash spring 144. This spring normally is disposed out of the plane of rotation of the rollers 142 carried by head 77 and in no wise interferes with the cooperation between rollers 142 and key 143 in the manner previously described. When the shoe supporting arm 102 is in its lowered position, with the shoe 44 in cooperating relation to the roll 43, as shown in Figure 3, key 143 occupies the position shown in full lines in Figure 14. With key 143 in that position, and supporting arm 123 in its dotted line position of Figure 14, one of the rollers 142 will pick up key 143 and turn it through approximately one-half of a revolution, as previously described. When disc 120 has been turned a short distance, moving roller 118 beyond its dead center position, rotation of disc 120 and member 121 is accelerated by the reaction of the springs 163 and 170 previously noted. As a result, member 121 overruns head 77 for a short distance, at which time back lash spring 144 comes into contact with cam element 172 and is deflected thereby into the plane of rotation of rollers 142, hook portion 146 picking up the other of these two rollers. When that occurs, head 77 is driven by member 121, so that the motor 163 is driven by member 121 through the gear train. This, in conjunction with the braking effect exerted by cam element 172, retards or slows down the member 121, without any objectionable shock or jar, after which the key 143 is again picked up by the roller 142 which first contacted this key and is moved thereby into its full line position shown in Figure 16, completing movement of the shoe away from the roll. In Figure 14, the key and the back lash spring 144 are shown in dotted lines in the positions which they occupy when member 121 has overrun head 77 sufficiently to cause hook 146 to pick up one of the rollers 142, spring 144 then being in contact with cam element 172 as explained. When the key 143 reaches its full line position shown in Figure 16, the back lash spring 144 is clear of cam element 172 and out of the plane of rotation of rollers 142. In the movement of key 143 from its full line position shown in Figure 16 to its full line position shown in Figure 15, for moving the shoe to the roll, the back lash spring 144 is clear of cam element 172. From what has been said, it will be understood that the shoe supporting arm 151 moves about the axis of shoe shaft 110, as indicated in Figures 15 and 16, in which the dot and dash line *g* may be taken as a line passing through the axis of shaft 110 and the axis of pin 169, line *g* occupying the position shown in Figure 15 when the shoe is in cooperating relation to the roll and occupying the position shown in Figure 16 when the shoe has been moved away from the roll.

As previously stated, the shoe 44 is of known construction and preferably heated by electrical resistance elements having an associated thermostat 173 (Figure 2), to which and the resistance element or elements, as the case may be, current is supplied by means of a suitable cord or cable 174 led through the tubular shaft 110 at a point within the sheet metal casing 105. The latter is provided with a flanged removable cover plate 175 and provides a housing for the outer end portion of shaft 110 and associated parts, as well as for the parts disposed at the outer face of cover 72 of head 53 of the gear housing. A suitable switch 176 (Figure 4) is disposed within casing 105 and the latter is also provided with a translucent panel or bull's-eye 177, conveniently illuminated by a lamp (not shown) disposed within casing 105, for indicating when the circuit is closed. It will be understood that appropriate electrical connections are provided between the cord or cable 174, the switch 176, electric motor 63 and a condenser 178 associated therewith disposed within roll 43 and mounted in any suitable manner on bracket 51. Conveniently the cable or cord 174 is provided at its free end with a plug cap 179 of known type, or any other suitable means may be provided for connecting the cable to a source of electric current. A single switch 176 may be provided for controlling supply of current to both the motor and the heating elements of the shoe, or, if desired, separate switches may be provided for that purpose, as will be understood.

The machine shown in Figures 17 to 31, inclusive, is in general similar to that shown in Figures 1 to 16, inclusive. It comprises a base 180 rectangular in plan, a gear housing 181 suitably secured to base 180 at one end thereof and extending upwardly therefrom, a roll 182 extending from gear housing 181 inwardly over the base and a shoe 183 movable to and from roll 182 into and out of cooperating relation thereto. Roll 182 comprises a sheet metal cylinder 184 and a suitable pad 185 mounted thereon in a known manner. A flanged ring 186 is secured in the inner end of cylinder 184, conveniently by spot welding, and has secured thereto a screen disc 187. A flanged disc 188 is secured in cylinder 184 at the mid-portion thereof, conveniently by spot welding, and receives a coaxial flanged bushing 189 suitably secured therein. Bushing 189 receives a stud 190 secured in a spider 191 of channel cross section at the inner end of a roll supporting bracket 192. Bracket 192 comprises a substantially cylindrical body 193 formed of sheet metal, in the inner end of which the spider 191 is secured, conveniently by spot welding. The outer end of body 193 is secured, conveniently by spot welding, in a cupped sheet metal disc 194. An electric motor 195 of suitable type is disposed within bracket 192, the latter having a suitable opening 196 for introduction of the motor. The latter is provided at its outer end with a suitably shaped head 197 (Figures 17 and 18) suitably secured, as by screws 198, to an appropriately formed boss 199 extending from the inner side wall of gear housing 181. Motor 195 is further provided, at its outer end, with a concentric collar 200 extending into a corresponding recess at the center of boss 199, this collar also passing through a central opening in disc 194, the body portion of this disc being clamped between head 197 and boss 199. An internal ring gear 201, provided with a plurality of outwardly extending radial lugs, as shown in Figure 26, is secured in the outer end of cylinder 184 in concentric relation therewith by screws 202. A plurality of rollers 203, mounted on pins 204 secured in ring gear 201, bear upon the circumferential surface of portion 205 of the flange of the cupped disc 194, the latter having a shoulder 206 inclined outward radially of disc 194, the outer end of which shoulder is substantially in the plane of the inner ends of the rollers 203. Bracket 192 and associated parts and the ring gear 201 and rollers 203 cooperate for supporting roll 182 for rotation about a fixed axis and confining it against transverse movement, the spider 191 and disc 188 cooperating with the shoulder 206 and the rollers 203 to confine roll 182 against endwise movement.

Shaft 207 of motor 195 extends through boss 199 into head 208 of gear housing 181. A helical pinion 209 is secured on the inner end of motor shaft 207, conveniently formed integrally therewith, and meshes with a helical gear 210 secured on a shaft 211, rotatably mounted in the inner side wall of gear housing 208 and in a removable cover 212 therefor secured to head 208 by means of screws or in any other suitable manner. A spur pinion 213 is secured on shaft 211, conveniently formed integrally therewith, and meshes with a spur gear 214 having a hub 215 mounted on and free from a countershaft 216 rotatably mounted through a boss 217 formed on the inner side wall of the gear housing 208. A spur pinion 218, secured on the outer end of countershaft 216, meshes with ring gear 201 for driving the roll 182. An inner roll clutch member 219, conveniently in the form of a steel stamping, is secured on the inner end of countershaft 216 and is formed to provide four equally spaced clutch teeth 220, shown more clearly in Figure 20. Inner clutch member 219 cooperates with an outer clutch member 221, comprising a stub shaft 222 slidable through cover 212 and disposed coaxially with countershaft 216, and a disc 223, conveniently in the form of a steel stamping, secured to the inner end of stub shaft 222 and having struck therefrom two diametrically opposite clutch teeth 224 equidistant from stub shaft 222. Two shouldered pins 225 are secured to disc 223 and project inwardly therefrom, at opposite sides of and equidistant from stub shaft 222, the reduced inner end portions of pins 225 being slidable axially in corresponding bores in gear 214. Hub 215 of gear 214 is confined between the inner roll clutch member 219 and an arm 226 pivoted at its upper end on countershaft 216, this arm and hub 215 cooperating with clutch member 219 and boss 217 and pinion 218 for confining countershaft 216 against lengthwise movement in either direction. Gear 214 is rotated clockwise as viewed in Figure 20, and is continuously driven from motor 195 when the latter is in operation, as will be clear from Figure 19, the outer roll clutch member 221 also being continuously driven clockwise with gear 214. In the inner position of clutch member 221, shown in Figure 27, clutch teeth 224 thereof engage two teeth 220 of clutch member 219 thus driving the countershaft 216 and thereby driving the roll 182. By moving the clutch member 221 outward into its inoperative or declutching position, in which teeth 224 will not engage with the teeth of clutch member 219, the roll is declutched from the motor and is no longer driven thereby.

Stub shaft 222 is provided at its outer end with an outwardly flaring frusto-conical head 228. A leaf spring 229, shown more clearly in Figure 21, is secured to the outer face of cover 212 at one end and has its free end bearing on the outer end of head 228 so as to urge clutch member 221 inward into operative or clutched position. A clutch control lever 230 is pivotally mounted at its rearward end, by a cap screw 231, on a boss 232 formed on the outer face of cover 212, with an intervening spring washer 233 providing friction means for holding the lever 230 in adjustment. A knob 234 is secured on the forward end of lever 230 for convenience in operating it, and this lever is provided with a depending arm 235 having an upwardly tapering slot 236 concentric with the pivot axis 230. Slot 236 receives head 228 of stub shaft 222. In the upper position of lever 230, shown in Figure 21, head 228 is at the lower or large end of slot 236 and passes freely therethrough, thus permitting movement of the clutch member 221 inward into clutched position, under the influence of spring 229. By swinging lever 230 downward, the upwardly converging edges of arm 235 defining the slot 236 are brought into contact with the inwardly converging or tapering head 228 of stub shaft 222, thus forcing this shaft outward in opposition to spring 229 until lever 230 reaches its lowermost position, at which time clutch member 221 has been moved outward into its inoperative or declutched position, in which position it is held by arm 235. The return of lever 230 to its raised position releases head 228 and permits return of clutch member 221, under the influence of spring 229, to its inner or clutched position.

Head 228 also passes through a downwardly tapering slot 237, in a finger 238 extending upward from the forward end of a shoe operating arm 239 mounted at its rearward end on a tubular shoe shaft 240. The shaft 240 is rockably mounted through a bearing sleeve 241 formed integrally with the gear housing structure 181, there being a stop collar 242 secured on shaft 240 at the inner end of sleeve 241. A hub member 243 is secured on the shaft 240, at the outer end of sleeve 241, and cooperates with the latter and with collar 242 for confining shoe shaft 240 against endwise movement in either direction. Hub member 243 is provided with an integral flange 244, shown more clearly in Figure 21, to which arm 239 is secured, conveniently by means of a screw 245. Suitable means is provided for swinging arm 239 upward and downward about the axis of shoe shaft 240, which means will be described presently, and the shoe is connected to shaft 240, by means to be described, to be moved thereby to and from the roll by rocking of shaft 240 in opposite directions responsive to movement of arm 239. When the shoe is in cooperating relation to roll 182, as shown in Figure 21, shoe operating arm 239 is in its lowered position there shown. At that time the upper wider end of slot 237 is positioned about head 228 on stub shaft 222 and, assuming the clutch control lever 230 to be in its raised position shown in Figure 21, clutch member 221 is held in its inner operative or clutched position shown in Figure 19 by spring 229. Upon upward movement of arm 239, shaft 240 is turned in clockwise direction, as viewed in Figure 21, moving shoe 183 away from roll 182, such upward movement of arm 239 causing corresponding upward movement of finger 238 thereof with resulting contact of the downwardly converging edges thereof defining slot 237 with head 228, thus forcing clutch member 221 outward into its inoperative or declutched position. That provides means whereby the roll 182 is automatically clutched to and declutched from the motor 195 responsive to movement of shoe 183 to and from the roll. Under normal conditions, when the machine is used for ironing, the clutch lever 230 remains in its raised position shown in Figure 21 and the roll 182 is automatically thrown into and out of operation in accordance with movement of the shoe to and from the roll. When it is desired to have the roll remain stationary during operation of the shoe, as when the machine is used for pressing, lever 230 is moved into its lowered position for holding clutch member 221 in its outer declutched position, in the manner above described. The adjacent end portions of the arm 235 and finger 238 are disposed in superposed relation, as shown in Figures 21 and 35, and the forward portions thereof operate between a boss 246 extending from the outer face of cover 212 and a washer 247 mounted about a cap screw 248 threaded into boss 246, there being a spacer 249 between boss 246 and washer 247. Arm 235 and finger 238 are thus guided and held against bending or flexing in the operation thereof for effecting desired adjustment of the clutch member 221.

Arm 226 is of generally triangular shape and is pivoted at its upper corner on countershaft 216 for swinging movement thereabout, as shown in Figures 19 and 21. A cylindrical stud 250 is secured in arm 226 adjacent the lower rearward corner thereof, as shown more clearly in Figure 30. Spur gear 251 is rotatably mounted on stud 250 in mesh with spur gear 214 and is thus continuously driven from the motor 195 when the latter is in operation. Two headed pins 252 are secured in gear 251 at opposite sides of and equidistant from the axis thereof and project outward therefrom. Gear 251 in conjunction with the pins 252 constitutes an inner shoe clutch member. An outer shoe clutch member 253 is rotatably mounted in a collar 254 of cover 212, with its inner end adjacent the outer side of gear 251. Member 253 is provided in its inner end with a diametrical slot in which is mounted a clutch key 254 of rectangular cross section disposed in the plane of rotation of the heads of pins 252. At its outer end member 253 is provided with a recess 255 which receives the head of a screw 256 passing axially therethrough, said screw also passing through the shank portion of a back lash leaf spring 257 and through a spacer 258 interposed between key 254 and the shank of spring 257, and screwing into key 254. Screw 256 thus serves to secure key 254 in the inner end of member 253, as well as to clamp spacer 258 and the shank of spring 257 between key 254 and the bottom or outer end of the slot and to secure these two latter members in position in the inner end of member 253. A disc 259 is secured to the outer end of member 253 for rotation therewith and cooperates with collar 254a and spring 257 for confining member 253 against lengthwise movement through collar 254a. Spring 257 normally is disposed outward beyond the heads of pins 252 out of the plane of rotation thereof, as shown in Figure 19. A headed pin 260, shown more clearly in Figure 21, is secured in disc 259 eccentric thereto with its head operating in a lengthwise slot 261 in the shoe operating arm 239. In the lower position of pin 260, shown in Figure 21, the shoe operating arm 239 is in its lowered position for holding shoe 183 in cooperating relation to roll 182. When disc 259 is turned one half of a revolution, the pin 260 swings arm 239 upward, thus moving the shoe 183 rearward away from roll 182.

Since arm 226 moves about the countershaft 216, gear 251 remains in mesh with gear 214 when arm 226 is shifted into either of its positions, to be referred to presently, for effecting adjustment of the shoe. Arm 226 is provided, at its lower forward portion, with a cam slot 262 shaped as shown in Figure 21. This slot receives the free end portion of inner arm 263 of a Z-shaped rod 264, outer arm 265 of which is rockably mounted through cover 212. The outer portion of arm 265 passes through the inner end of a control lever 266 projecting forwardly of gear housing 181 and provided, at its forward end, with a knob 267 for convenience in operating this lever. A wire spring 268 is inserted through arm 265 at the outer face of lever 266, the upper end of this spring being bent at right angles and inserted through a corresponding bore in lever 266, the lower free end of spring 268 contacting a double cam element 269 of substantially V-shape projecting from the outer face of cover 212 adjacent the lower edge thereof. It will be seen that when lever 266 is in its full line position shown in Figure 21 spring 268 holds it in that position by contact with the rearward inclined face of the cam element 269, and when lever 266 is swung into its upper position, indicated by the dotted line position of knob 267 and the dot and dash line 266a, spring 268 passes over the vertex of cam element 269 and by contact with the forward inclined surface thereof holds lever 266 in its latter or raised position. Due to the connection between arm 265 and lever 266, through spring 268, rod 264 will turn with lever 266 about the axis of arm 265. This turning of rod 264 serves to swing arm 226 about countershaft 216, so as to dispose the axis of gear 251 eccentric to and alternately at opposite sides of the axis of member 253.

Figure 28:
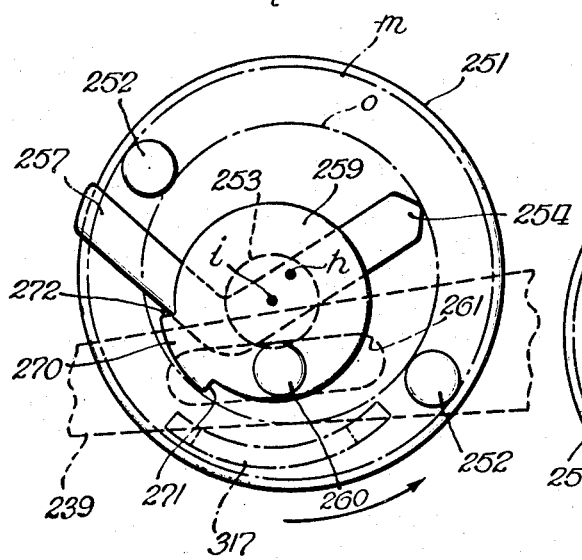

Gear 251 is rotated counter-clockwise, as viewed from its outer face and as indicated in Figures 28 to 31, inclusive. In Figure 28, the relation of the parts there shown corresponds to their relative positions when the shoe operating arm 239 is in its lowered position shown in Figure 21. At that time control lever 266 is in its lowered position and gear 251 is disposed with its axis $h$ above and slightly in back of axis $i$ of member 253. Clutch key 254 is then so disposed as to be out of the path of travel of the two pins 252, corresponding to the annular base defined by the two concentric dot and dash circles $m$ and $o$, the key 254 being of appropriate length for that purpose. When it is desired to move the shoe 183 away from roll 182, control lever 266 is swung into its upper position, thus shifting gear 251 from its position shown in Figure 28 to its position shown in Figure 31, in which latter position axis $h$ of gear 251 is disposed below and in front of axis $i$ of member 263. With gear 251 in its latter position and clutch key 254 in its position shown in Figure 28, in the continued rotation of gear 251 one of the pins 252 will contact key 254 and turn it through a half of a revolution into its position shown in Figure 31, in which latter position key 254 is disposed to clear pins 252 in the continued rotation of gear 251. Disc 259 is thus turned through one-half of a revolution and then released, with corresponding movement of pin 260 from its lower position shown in Figure 28 to its upper position shown in Figure 31. That serves to raise shoe operating arm 239 for moving the shoe 183 rearward away from roll 182. Gear 251 and member 253 and the associated parts thus provide a half revolution clutch for alternately raising and lowering the shoe operating arm 239 and thereby moving the shoe to and from the roll as desired under control of the lever 266.

In either position of the shoe operating arm 239 the point of application of pressure between pin 260 and arm 239 is substantially on dead center with pin 260 and disc 259 and that relation of the parts referred to, together with the slight friction present, may ordinarily be relied upon for maintaining arm 239 in desired adjustment. There is the possibility, however, that excessive vibration or jarring of the machine might disturb that dead center relation and permit slight turning of disc 259 and member 253 in amount sufficient to cause key 254 to intersect at a slight angle the path of travel of the rollers 252, possibly resulting in one of these rollers striking the key and jamming therewith. In order to avoid that possible difficulty, I provide means whereby turning of disc 259 in either direction is positively limited. To that end disc 259 is provided with an outwardly extending element 270 providing two shoulders 271 and 272. Control lever 266 is provided, at its rearward end, with an upper arm 273 having at its rearward end an outwardly projecting finger 274, and a lower arm 275 having at its rearward end an outwardly projecting finger 276. When control lever 266 is in its lowered position, with shoe operating arm 239 in its lowered position and pin 260 also in its lowered position, shoulder 271 of element 270 is in contact with finger 276, and the axis of pin 260 is slightly in back of the vertical plane of the axis of disc 259 so that any tendency of the latter to rotate would be in a counterclockwise direction. At that time the clutch key 254 is in the position shown in Figure 28 and since disc 259 is effectively locked against rotation in the manner stated, possibility of key 254 turning into a position to intersect the path of travel of pins 252 is eliminated. When the control lever 266 is in its upper or raised position and disc 259 has been turned through a half revolution so as to move pin 260 from its lower position indicated in dot and dash lines in Figure 26, to its upper position shown in full lines in the latter figure, shoulder 271 of element 270 is in contact with the rearward face of finger 274. Since at this time any tendency to rotation of disc 259 is in a counterclockwise direction, disc 259 and member 253 are effectively held against turning movement and the clutch key 254 is held in its position shown in Figure 31, in which it clears the pins 252, possibility of this key turning beyond that position so as to intersect the path of travel of pins 252 being thus eliminated. The means for holding the disc 259 in either of its adjusted positions in the manner described also eliminates possibility of turning of this disc from either of its adjusted positions through a considerable distance, such as would permit undesired movement of the shoe to or from the roll, in the event of the machine being subjected to excessive vibration or jarring such as would materially disturb the dead center relation between the point of application of pressure between arm 239 and pin 260 and this pin and disc 259.

Head 208 of gear housing 181 is provided, at its inner side, with an upward extension 277, shown more clearly in Figure 20, of substantially semi-circular shape merging into the head, this extension having suitable ventilating openings 278 therein and a web element 279 therebetween. A light socket 280 of suitable type is secured, in any suitable manner, to web 279 and receives a light bulb 281. A sheet metal casing 282 is suitably secured, conveniently by means of screws, to gear housing 181 and encloses head 208 and the extension thereof, as well as the parts disposed at the outer face of cover 212 and the parts associated therewith. Casing 282 is provided with upper and lower slots 283 and 284, respectively, which accommodate the levers 230 and 266. The outer side of casing 282 is closed by a flanged cover plate 285 removably secured thereto by screws or in any other suitable manner, the lower end of this plate being secured by screws to the base portion of gear housing 181, as shown more clearly in Figure 19. An electrical cord or cable 287, led through the back of casing 282, has suitable connection to a cable 288 extending through the inner wall of gear housing 181 and below shoe shaft 240 with suitable connection to the heating element of shoe 183 and to a thermostat 289 associated therewith. Suitable electrical connections also are provided to the lamp socket 280, the motor 195 and a condenser 290 disposed within and suitably mounted on the roll bracket 192. Any suitable means, such as a plug cap of known type, may be provided for connecting the cable or cord 288 to a suitable source of supply of electric current and, if desired, a control switch may be associated with cable or cord 288 in a known manner. The lamp bulb 281 is disposed in back of a translucent name plate 291, formed of glass or other suitable material, mounted in casing 282, this plate being illuminated by the lamp when the circuit is closed and serving to signal the condition of the circuit, that is, whether the circuit is closed or open. The shoe 183 is provided with a sheet metal back cover 292 providing, with the shoe, a housing for the thermostat 289 and the resistance or heating element associated with the shoe and associated parts.

The heating elements of shoe 183 are secured by three channel clamps, one of which is shown at 293, in the same manner as in Figure 2. A U-shaped bracket 295 is slidable through the central clamp 293 and is adjustably connected thereto by an adjusting screw 296, having oppositely threaded portions, provided with a knob 297 on its rearward end.

Two steel rods, one of which is shown at 298, are pivoted at their upper ends to the arms of bracket 295, by fingers 300 bent substantially at right angles thereto. The lower end of one rod 298 extends through a circumferential slot 303 in shaft 240 and is secured by a set screw 304 in a cylindrical block 302, mounted in the inner end of shaft 240 for relative turning movement and projecting inwardly therebeyond. The other rod 298 has its lower end secured in block 302 beyond the inner end of shaft 240. The rods pass through slots (not shown) in a foot element 307 at the lower end of a release lever 308, loosely attached by a headed screw 309 to shaft 240. Foot element 307 is provided at its forward side with a hook element 310 normally engaging in a lengthwise slot 311 in shaft 240 and providing operating connection between the latter and block 302, as in Figure 21.

Release lever 308 is provided at its upper end with a knob 313 and, below knob 313, with a suitable opening (not shown) to accommodate adjusting screw 296 and knob 297 thereof. A U-shaped spring clip 315, having forwardly diverging arms 315 each provided with an outwardly extending terminal element 316, is secured to the midportion of release lever 308 and fits between rods 298. With the parts in their positions shown in Figure 21, by swinging release lever 308 rearward, hook element 310 is disengaged from slot 311, after which terminal elements 316 pick up rods 298 and swing them rearward, moving shoe 183 away from roll 182 a distance permitted by slot 303. That provides safety means for quickly releasing the shoe from the roll. In order to reestablish operating connection between block 302 and shaft 240, the latter is turned clockwise, from its position shown in Figure 21 into the position which it occupies when shoe 183 has been moved from roll 182 by turning of shaft 240. The release lever 308 is then swung forward, and the arms of clip 315 pick up rods 298 swinging them forward as permitted by slot 303. In the continued forward movement of release lever 308 spring clip 315 passes forward between rods 298 and hook element 310 is reengaged with slot 311 so that, upon counterclockwise rotation of shaft 240, the shoe is moved to the roll, the parts being then returned to their positions shown in Figure 21.

*Operation*

Figure 29:
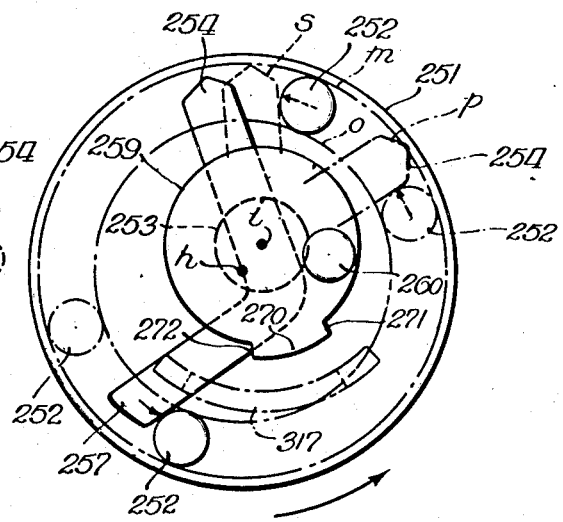
Figure 30:
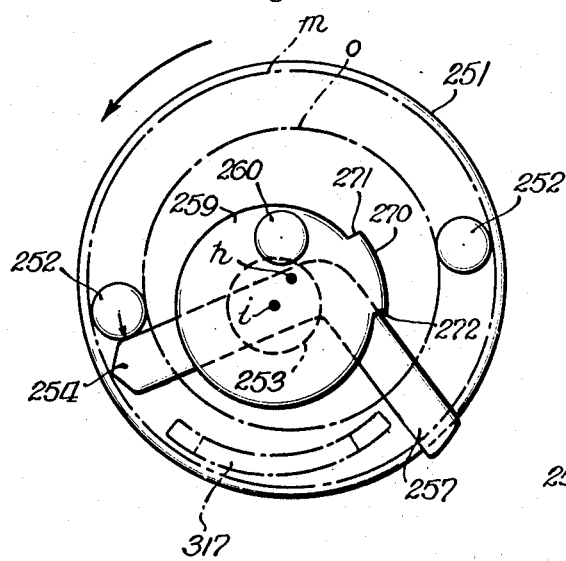
Figure 31:
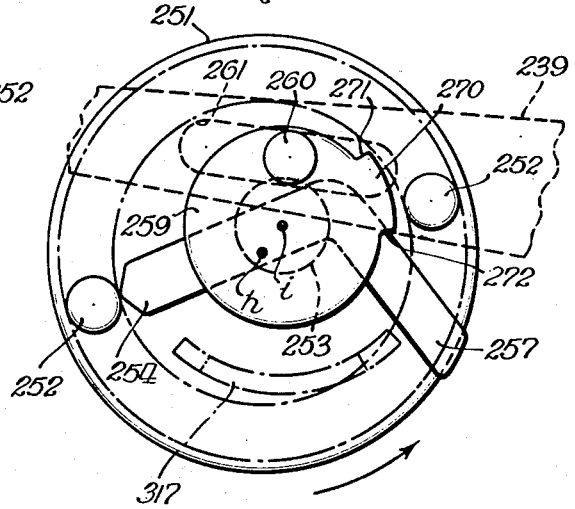

When shoe operating arm 239 is in its lowered position, shown in Figure 21, the shoe 183 is in cooperating relation to roll 182 and is urged toward the latter by the spring pressure of the rods 298 which are then slightly bent or flexed so as to be under tension. At that time the clutch key 254 and the back lash spring 257 are in the positions shown in Figure 28, key 254 being disposed to clear the pins 252 and spring 257 being out of the plane of rotation of these pins. In order to move the shoe away from the roll, gear 251 is shifted from its position shown in Figure 28 to its position shown in Figure 29. One of the pins 252 picks up key 254 and moves it from its position p in Figure 29, which corresponds to the position of key 254 in Figure 28, to about position s, thus moving the eccentric pin 260 of disc 259 from its position shown in Figure 28 to its position shown in Figure 29. At that time, the reaction of rods 298 exerts a spring effect and, through shaft 240 and arm 239, causes member 253 to overrun gear 251, key 254 traveling in advance of the pin 252 which at position s of key 254, in Figure 29, is in contact therewith.

When this occurs, back lash spring 257 is brought into contact with a cam element 317 projecting from the inner face of cover 212 (Figure 22) and is deflected by cam element 317 inward into the path of travel of the pins 252. Immediately thereafter, spring 257 contacts the other pin 252, that is, pin 252 remote from key 254, so that member 253, through spring 257, then drives motor 195 through the gear train. That, in conjunction with the braking effect of the contact between spring 257 and cam element 317, serves to slow down member 253 so that the pin 252 which first picked up key 254 again picks up this key and moves it into its position shown in Figure 31, in which it clears the pins 252. That completes turning of disc 259 through one-half of a revolution, thus raising the shoe operating arm 239 into its position shown in Figure 31 and completing movement of the shoe away from the roll. At that time spring 257 is disposed beyond cam element 317 and is then out of the path or plane of rotation of the pins 252. In order again to return the shoe into cooperating relation to the roll, gear 251 is shifted from its position shown in Figure 31 to its position shown in Figure 30, in which latter position of gear 251 one of the pins 252 picks up key 254 and moves it into its position shown in Figure 28, in which latter position both key 254 and spring 257 are disposed to clear the pins 252. The gear 251 rotates counterclockwise, as viewed in Figures 28 to 31, inclusive, and it will be clear from Figures 30 and 28 that in the movement of key 254 from its position shown in Figure 30 to its position shown in Figure 28, the spring 257 does not contact the cam element 317, there being no necessity for retarding rotation of member 253 in the movement of the shoe to the roll, spring 257 remaining out of the path of rotation of pins 252 except during the movement of the shoe away from the roll.

It will be understood that various changes in construction and arrangement of parts of my invention may be resorted to without departing from the field and scope thereof, and I intend to include all such variations, as fall within the scope of the appended claims, in this application in which the preferred forms only of my invention have been disclosed.

I claim:

1. In an ironing machine, a gear housing, a roll extending from one side of said housing mounted thereon for rotation about a fixed axis, a cooperating shoe movable to and from said roll, a motor secured to said one side of said housing extending therefrom into said roll, said gear housing being disposed exteriorly of said roll, driving connections between said motor and said roll, and means operated by said motor for moving said shoe to and from said roll, said means comprising means within said housing exterior of said roll and driven by said motor.

2. In an ironing machine, a gear housing, a roll, said gear housing being exterior of said roll, a roll supporting bracket structure secured at one end to said housing at one side thereof extending therefrom into said roll with one end of the latter adjacent said one side of said housing, said bracket structure extending radially to within a short distance of the surrounding wall of said roll and being open at its center and unobstructed interiorly, a ring gear adjacent said side of said housing secured to said one end of said roll concentric therewith, means cooperating with said roll and bracket and ring gear for supporting said roll and said ring gear for rotation about a fixed common axis, a shoe, a motor secured to said one side of said housing extending therefrom into said roll and into said bracket structure, driving connections between said motor and said ring gear comprising gearing within said housing, and means operated by said motor for moving said shoe to and from said roll comprising means within said gear housing.

3. In an ironing machine, a gear housing, a roll, a roll supporting bracket secured at one end to said housing in spaced relation thereto and extending therefrom into said roll with one end of the latter adjacent said housing, an internal ring gear secured in said one end of said roll coaxial therewith between said bracket and said housing, means on said housing supporting said ring gear and said one end of said roll for rotation about a fixed axis, cooperating means carried by said roll and said bracket at the other end of the latter supporting said roll for rotation about said axis, a shoe, a motor secured to said housing extending therefrom into said roll, driving connections between said motor and said ring gear, and means operated by said motor for moving said shoe to and from said roll.

4. In an ironing machine, a gear housing, a roll, a roll supporting bracket secured at one end to said housing in spaced relation thereto and extending therefrom into said roll with one end of the latter adjacent said housing, an apertured supporting disc secured in said one end of said roll between said bracket and said housing, an internal ring gear secured to said disc confined between the latter and said housing concentric with said roll, rollers mounted on said housing supporting said ring gear for rotation about a fixed axis, said bracket having means cooperating with said disc restraining endwise movement of said roll, cooperating means carried by said roll and said bracket at the other end of the latter supporting said roll for rotation about said axis, a shoe, a motor secured to said housing extending therefrom into said roll, driving connections between said motor and said ring gear, and means operated by said motor for moving said shoe to and from said roll.

5. In an ironing machine, a gear housing, a roll, a roll supporting bracket secured at one end to said housing in spaced relation thereto and extending therefrom into said roll with one end of the latter adjacent said housing, said one end of said bracket defining a substantially continuous cylindrical bearing surface, an internal ring gear secured in said one end of said roll concentric therewith between said bracket and said housing, rollers carried by said ring gear contacting said bearing surface and supporting said ring gear and said one end of said roll for rotation about a fixed axis, cooperating means carried by said bracket at the other end thereof and by said roll supporting the latter for rotation about said axis, a shoe, a motor secured to said housing extending therefrom into said roll, driving connections between said motor and said ring gear, and means operated by said motor for moving said shoe to and from said roll.

6. In an ironing machine, a gear housing, a roll, a roll supporting bracket secured at one end to said housing in spaced relation thereto and extending therefrom into said roll with one end of the latter adjacent said housing, said one end of said bracket defining a substantially continuous cylindrical bearing surface and an outwardly inclined shoulder extending therefrom, an internal ring gear secured in said one end of said roll concentric therewith between said bracket and said housing, rollers carried by said ring gear contacting said bearing surface and supporting said ring gear and said one end of said roll for rotation about a fixed axis, said rollers and said shoulder and said ring gear and bracket restraining said roll against endwise movement, cooperating means carried by said bracket at the other end thereof and by said roll supporting the latter for rotation about said axis, a shoe, a motor secured to said housing extending therefrom into said roll, driving connections between said motor and said ring gear, and means operated by said motor for moving said shoe to and from said roll.

7. In an ironing machine, a gear housing, a roll extending from said housing mounted thereon for rotation about a fixed axis, a cooperating shoe, a motor secured to said housing extending therefrom into said roll, driving connections between said motor and said roll, a first rotatably mounted member continuously driven by said motor, a second member mounted for intermittent rotation by said first member, cooperating drive means on said members disposed at radial distances from the respective axes of rotation thereof, one of said members being journaled for rotation about a fixed axis and the other of said member being journaled for rotation about an axis selectively movable to either of two opposite positions radially spaced from said fixed axis, said radial spacing and said radial distances of said drive means being such that said drive means pass out of driving engagement when said other member has turned through approximately one half revolution, and connections between said second member and said shoe for moving the latter to and from said roll.

8. In an ironing machine, a gear housing, a roll extending from said housing mounted thereon for rotation about a fixed axis, a cooperating shoe, a motor secured to said housing extending therefrom into said roll, driving connections between said motor and said roll, a first shoe clutch member rotatable about a fixed axis continuously driven by said motor, a second shoe clutch member mounted for intermittent rotation by said first member, cooperating drive means on said members disposed at radial distances from the respective axes of rotation thereof, one of said members being journaled for rotation about a fixed axis and the other of said members being journaled for rotation about an axis selectively movable to either of two opposite positions radially spaced from said fixed axis, said radial spacing and said radial distances of said drive means being such that said drive means pass out of driving engagement when said other member has turned through approximately one half revolution, and connections between said second member and said shoe for moving the latter to and from said roll.

9. In an ironing machine, a gear housing, a roll extending from said housing mounted thereon for rotation about a fixed axis, a cooperating shoe, a motor secured to said housing extending therefrom into said roll, driving connections between said motor and said roll, a first shoe clutch member rotatable about a fixed axis continuously driven by said motor, a supporting arm pivoted on said housing, a second shoe clutch member comprising a disc rotatably mounted on said arm, means for adjusting said arm into positions disposing the axis of rotation of said second member at either of two opposite positions radially spaced from said fixed axis, cooperating drive means on said members disposed at radial distances from the respective axes of rotation thereof, said radial spacing and said radial distances of said drive means being such that said drive means pass out of driving engagement when said second member has turned through approximately one half revolution, a shoe operating arm, and an eccentric connection between said shoe operating arm and said disc.

10. In an ironing machine, a gear housing, a roll extending from said housing mounted thereon for rotation about a fixed axis, a cooperating shoe, a motor secured to said housing extending therefrom into said roll, driving connections between said motor and said roll, a first rotatably mounted shoe clutch member continuously driven by said motor, a second shoe clutch member comprising a disc mounted for intermittent rotation by said first member, cooperating drive means on said members disposed at radial distances from the respective axes of rotation thereof, one of said members being journaled for rotation about a fixed axis and the other of said members being journaled for rotation about an axis selectively movable to either of two opposite positions radially spaced from said fixed axis, said radial spacing and said radial distances of said drive means being such that said drive means pass out of driving engagement when said second member has turned through approximately one half revolution, means for moving said shoe to and from the roll comprising a shoe operating arm and means for holding said shoe to the roll under spring pressure, an eccentric pin and slot connection between said disc and said shoe operating arm for operating the latter, and cam means for retarding turning of said second clutch member relative to said first clutch member in the initial movement of said shoe away from said roll.

11. In an ironing machine, a gear housing, a roll extending from said housing mounted thereon for rotation about a fixed axis, a cooperating shoe, a motor secured to said housing extending therefrom into said roll, driving connections between said motor and said roll, a first shoe clutch member rotatable about a fixed axis continuously driven by said motor, a supporting arm pivoted on said housing, a second shoe clutch member comprising a disc rotatably mounted on said arm, means for adjusting said arm into positions disposing the axis of rotation of said second member eccentric to and alternately at opposite sides of the axis of rotation of said first clutch member, two diametrically opposite pins carried by said first clutch member equidistant from the axis thereof extending toward said second clutch member, a key secured to said second clutch member projecting to one side thereof in the plane of rotation of said pins, said key being of a length to be picked up by one of said pins responsive to shifting of the axis of said second member from one position of eccentricity to the other and to clear said pins when said second member has been turned through approximately one half of a revolution, means for moving said shoe to and from said roll comprising a shoe operating arm and means for holding said shoe to the roll under spring pressure, an eccentric pin and slot connection between said disc and said shoe operating arm for operating the latter, a cam element on said supporting arm, and a leaf spring secured to said second clutch member projecting beyond the opposite side thereof normally out of the plane of rotation of said pins disposed to contact said cam element and be deflected thereby into said plane in the movement of said shoe away from said roll.

12. In an ironing machine, a roll, a cooperating shoe, a motor, driving connections between said motor and said roll, a first rotatably mounted clutch member continuously driven by said motor carrying two diametrically opposite outwardly extending pins equidistant from its axis of rotation, a pivoted supporting arm, a second clutch member rotatably mounted on said arm adjacent the outer end of said first member, means for adjusting said arm into positions disposing the axis of rotation of said second member eccentric to and alternately at opposite sides of the axis of said first member, a key secured to the inner end of said second member projecting to one side thereof in the plane of rotation of said pins, said key being of a length to be picked up by one of said pins responsive to shifting of the axis of said second member from one position of eccentricity to the other and to clear said pins when said second member has been turned through approximately one half of a revolution, means for moving said shoe to and from said roll comprising a shoe operating arm and means for holding said shoe to said roll under spring pressure, an eccentric pin and slot connection between the outer end of said second member and said shoe operating arm for operating the latter, a cam element on said supporting arm, and a leaf spring secured to said second clutch member projecting beyond the opposite side thereof normally out of the plane of rotation of said pins disposed to contact said cam element and be deflected thereby into said plane in the movement of said shoe away from said roll.

13. In an ironing machine, a gear housing, a roll extending from said housing mounted thereon for rotation about a fixed axis, a cooperating shoe, a motor secured to said housing extending therefrom into said roll, a counter shaft mounted in said housing having driving connection at its outer end to said roll, a stub shaft mounted in said housing adjacent the inner end of said counter shaft coaxial therewith and free therefrom, a gear secured on the inner end of said stub shaft provided at its inner face with clutch pins and continuously driven from said motor, a roll clutch member cooperating with said pins slidable on said counter shaft having driving connection thereto, a first shoe clutch member secured on the outer end of said stub shaft, a second shoe clutch member rotatably mounted adjacent the outer face of said first member, cooperating drive means on said members disposed at radial distances from the respective axes of rotation thereof, one of said members being journaled for rotation about a fixed axis and the other of said members being journaled for rotation about an axis selectively movable to either of two opposite positions radially spaced from said fixed axis, said radial spacing and said radial distances of said drive means being such that said drive means pass out of driving engagement when said second member has turned through approximately one half revolution, a shoe operating arm, eccentric pin and slot connections between said arm and the outer end of said second member, and means actuated by said arm for moving said roll clutch member into clutching and declutching relation to said pins responsive to movement of said shoe to and from said roll.

14. In an ironing machine, a roll mounted for rotation about a fixed axis, a cooperating shoe, a motor housed within said roll having driving connection therewith, a gear member continuously driven by said motor, a shoe operating member rotatably mounted adjacent one side of said gear member, cooperating drive means on said members disposed at radial distances from the respective axes of rotation thereof, one of said members being journaled for rotation about a fixed axis and the other of said members being journaled for rotation about an axis selectively movable to either of two opposite positions radially spaced from said fixed axis, said radial spacing and said radial distances of said drive means being such that said drive means pass out of driving engagement when said shoe operating member has turned through approximately one half revolution, and connections between said shoe operating member and said shoe for moving the latter to and from said roll.

15. In an ironing machine, a roll mounted for rotation about a fixed axis, a cooperating shoe, a motor housed within said roll having driving connection therewith, a gear continuously driven by said motor provided at its outer side with two diametrically opposite clutch pins equidistant from the axis of said gear, a shoe operating member mounted adjacent the outer face of said gear for rotation about a fixed axis, means for adjusting said gear into positions with its axis eccentric to and alternately at opposite sides of the axis of rotation of said member, a clutch key secured to the inner end of said member projecting to one side thereof in the plane of rotation of said pins, said key being of a length to be picked up by one of said pins responsive to shifting of the axis of said gear from one position of eccentricity to the other and to clear said pins when said member has been turned through approximately one half of a revolution, means for moving said shoe to and from said roll comprising a shoe operating arm and means for holding said shoe to said roll under spring pressure, an eccentric pin and slot connection between said arm and said shoe operating member, a fixed cam element, and a leaf spring secured to said shoe operating member projecting beyond the opposite side thereof normally out of the plane of rotation of said pins disposed to contact said cam element and be deflected thereby into said plane in the movement of said shoe away from said roll.

16. In an ironing machine, a roll mounted for rotation about a fixed axis, a cooperating shoe, a motor housed within said roll having driving connection therewith, a gear member continuously driven by said motor, a shoe operating member rotatably mounted adjacent one side of said gear member, a control lever, cooperating drive means on said members disposed at radial distances from the respective axes of rotation thereof, said shoe operating member being journaled for rotation about a fixed axis and said gear member being journaled for rotation about an axis selectively movable to either of two opposite positions radially spaced from said fixed axis, said radial spacing and said radial distances of said drive means being such that said drive means pass out of driving engagement when said shoe operating member has turned through approximately one half revolution, connections between said control lever and said gear member for moving the latter into either of its said two positions, connections between said shoe operating member and said shoe for moving the latter to and from said roll, and cooperating members respectively carried by said control lever and said shoe operating member limiting turning of the latter at each operation thereof to approximately one half of a revolution.

17. In an ironing machine, a roll mounted for rotation about a fixed axis, a cooperating shoe, a motor housed within said roll, a gear continuously driven by said motor about a fixed axis, a second gear meshing with said first gear and adjustable about the axis thereof, a shoe operating member rotatably mounted adjacent one side of said second gear, a control lever, cooperating drive means on said second gear and said shoe operating member disposed at radial distances from the respective axes of rotation thereof, said shoe operating member being journaled for rotation about a fixed axis and said second gear being journaled for rotation about an axis selectively movable to either of two opposite positions radially spaced from said fixed axis, said radial spacing and said radial distances of said drive means being such that said drive means pass out of engagement when said shoe operating member has turned through approximately one half revolution, connections between said control lever and said second gear for moving the latter into either of its said two positions, connections between said shoe operating member and said shoe comprising a shoe operating arm for moving said shoe to and from said roll, a shaft having driving connection to said roll, and means actuated by said shoe operating arm for clutching and declutching said shaft to and from said first gear responsive to movement of said shoe to and from said roll.

18. In an ironing machine, a roll mounted for rotation about a fixed axis, a cooperating shoe, a motor housed within said roll, a gear continuously driven by said motor about a fixed axis, a second gear meshing with said first gear and adjustable about the axis thereof, a shoe operating member rotatably mounted adjacent one side of said second gear, a control lever, cooperating drive means on said second gear and said shoe operating member disposed at radial distances from the respective axes of rotation thereof, said shoe operating member being journaled for rotation about a fixed axis and said second gear being journaled for rotation about an axis selectively movable to either of two opposite positions radially spaced from said fixed axis, said radial spacing and said radial distances of said drive means being such that said drive means pass out of engagement when said shoe operating member has turned through approximately one half revolution, connections between said control lever and said second gear for moving the latter into either of its said two positions, connections between said shoe operating member and said shoe comprising a shoe operating arm for moving said shoe to and from said roll, a shaft having driving connection to said roll, a first roll clutch member secured on said shaft, a second roll clutch member rotating with said first gear yieldingly urged toward and movable into and out of clutching engagement with said first clutch member, said second clutch member having a tapered head, a finger carried by said arm having a tapered slot receiving said head effective for causing movement of said second clutch member into and out of engagement with said first clutch member responsive to movement of said shoe to and from said roll, and a manual roll clutch lever having a finger disposed in superposed relation to said first finger and provided with a tapered slot receiving said head, said second finger being effective for moving said second clutch member into declutching position and maintaining it there independently of movement of said arm.

19. In an ironing machine, a roll and a cooperating shoe movable to and from said roll, a motor for driving said roll, a first rotatably mounted member continuously driven by said motor, a second member mounted for intermittent rotation by said first member, cooperating drive means on said members disposed at radial distances from the respective axes of rotation thereof, one of said members being journalled for rotation about a fixed axis and the other of said members being journalled for rotation about an axis selectively movable to either of two opposite positions radially spaced from said fixed axis, said radial spacing and said radial distances of said drive means being such that said drive means pass out of driving engagement when said other member has turned through approximately one half revolution, and operating connections between said second member and said shoe.

20. In an ironing machine, a gear housing, a roll supporting means secured to one side of said housing, a roll mounted on said supporting means for rotation about a fixed axis with one end adjacent said housing and open at its other end, a motor secured to said one side of said housing extending therefrom into and housed within said roll, a shoe movable to and from said roll, means within said housing driven by said motor for driving said roll, and means within said housing driven by said motor for operating said shoe.

21. In an ironing machine, a roll supported from one end for rotation about a fixed axis and open at its other end, a cooperating shoe movable to and from said roll, a motor housed within said roll, means for optionally driving said roll from said motor, and means operable by said motor for moving said shoe to and from said roll.

22. In an ironing machine, a roll supported from one end for rotation about a fixed axis and open at its other end, a cooperating shoe movable to and from said roll, a motor housed within said roll, means for optionally driving said roll from said motor, and means operable by said motor independently of the operation of said roll for moving said shoe to and from said roll.

FREDERICK M. FREIS.